United States Patent
Urakawa

(10) Patent No.: US 9,671,948 B2
(45) Date of Patent: Jun. 6, 2017

(54) IMAGE-DISPLAY CONTROL SYSTEM, IMAGE-DISPLAY CONTROL METHOD, AND NON-TRANSITORY COMPUTER-READABLE STORAGE MEDIUM STORING IMAGE-DISPLAY CONTROL PROGRAM

(71) Applicant: Yutaka Urakawa, Nagoya (JP)

(72) Inventor: Yutaka Urakawa, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 187 days.

(21) Appl. No.: 14/025,304

(22) Filed: Sep. 12, 2013

(65) Prior Publication Data

US 2014/0173505 A1  Jun. 19, 2014

(30) Foreign Application Priority Data

Sep. 12, 2012 (JP) .................. 2012-200501

(51) Int. Cl.
*G06F 3/0485* (2013.01)
*G06F 3/0488* (2013.01)

(52) U.S. Cl.
CPC .......... *G06F 3/0485* (2013.01); *G06F 3/0488* (2013.01)

(58) Field of Classification Search
CPC .............................. G06F 3/0485; G06F 3/0482
See application file for complete search history.

(56) References Cited

U.S. PATENT DOCUMENTS

| | | | | |
|---|---|---|---|---|
| 6,133,915 A * | 10/2000 | Arcuri et al. | ................. | 715/779 |
| 7,401,300 B2 * | 7/2008 | Nurmi | ........................... | 715/866 |
| 8,363,009 B1 * | 1/2013 | Queru | ........................... | 345/156 |
| 2006/0033721 A1 * | 2/2006 | Woolley et al. | .............. | 345/173 |
| 2008/0222558 A1 * | 9/2008 | Cho et al. | ...................... | 715/784 |
| 2009/0193351 A1 * | 7/2009 | Lee et al. | ....................... | 715/769 |
| 2010/0175027 A1 * | 7/2010 | Young et al. | .................. | 715/830 |
| 2010/0211915 A1 * | 8/2010 | Sawai | ........................... | 715/830 |
| 2010/0229090 A1 * | 9/2010 | Newton et al. | ............... | 715/702 |
| 2011/0107209 A1 * | 5/2011 | Ha et al. | ....................... | 715/702 |
| 2011/0122159 A1 * | 5/2011 | Bergsten et al. | ............. | 345/684 |

(Continued)

FOREIGN PATENT DOCUMENTS

| | | |
|---|---|---|
| JP | 2007-011797 A | 1/2007 |
| JP | 2012-073771 A | 4/2012 |

*Primary Examiner* — David Choi

(74) *Attorney, Agent, or Firm* — Scully, Scott, Murphy & Presser, P.C.

(57) ABSTRACT

An image-display control system including: a display having a display area; a touch panel; a processor; and a memory storing instructions that, when executed by the processor, cause the system to: display object images arranged in a first direction in the display area; determine a touch and a position of the touch; define, in the display area, first and second operation regions arranged in a second direction orthogonal to the first direction, the first operation region being not defined in the identical position to the second operation region, at least a part of each object image being displayed in the two operation regions; when determined the touch in the first operation region, execute a unique process assigned for one of the object images displayed at a position of the touch; and when determined the touch in the second operation region and when determined that a position of the touch is moving in the first direction while keeping the touch, scroll the object images in the first direction.

10 Claims, 13 Drawing Sheets

(56) References Cited

U.S. PATENT DOCUMENTS

| | | | |
|---|---|---|---|
| 2011/0239155 A1* | 9/2011 | Christie | 715/784 |
| 2011/0252300 A1* | 10/2011 | Lloyd et al. | 715/217 |
| 2013/0063378 A1* | 3/2013 | Shin | 345/173 |
| 2014/0033093 A1* | 1/2014 | Brauninger et al. | 715/765 |
| 2014/0173505 A1* | 6/2014 | Urakawa | 715/784 |

* cited by examiner

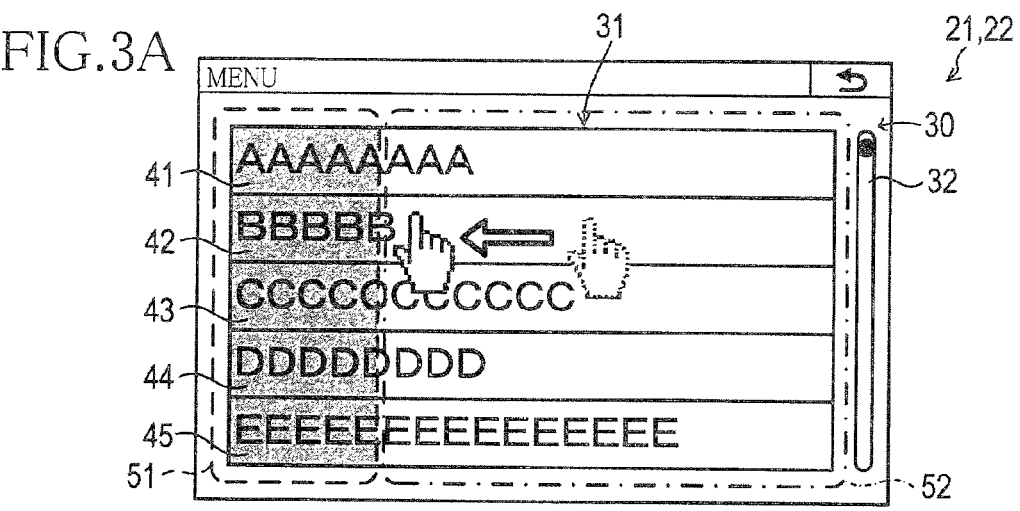
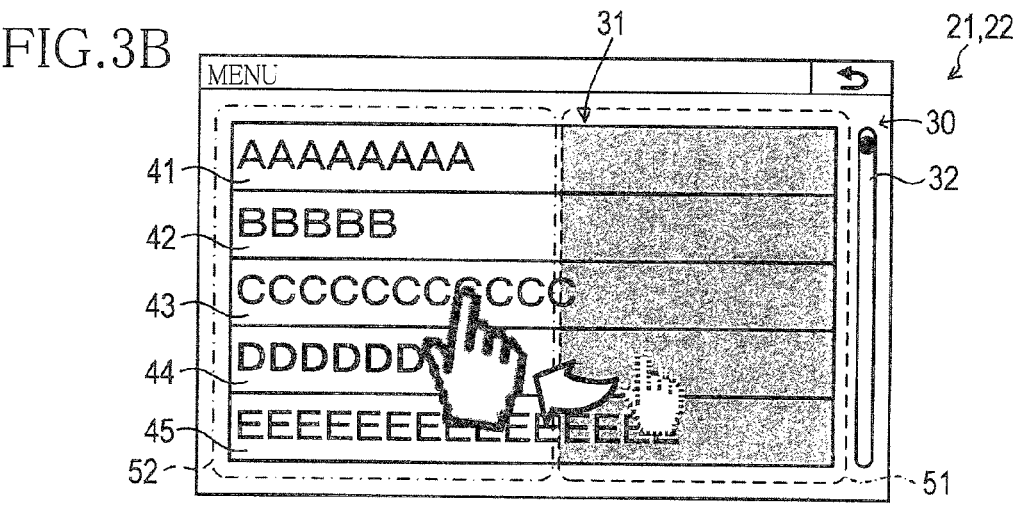
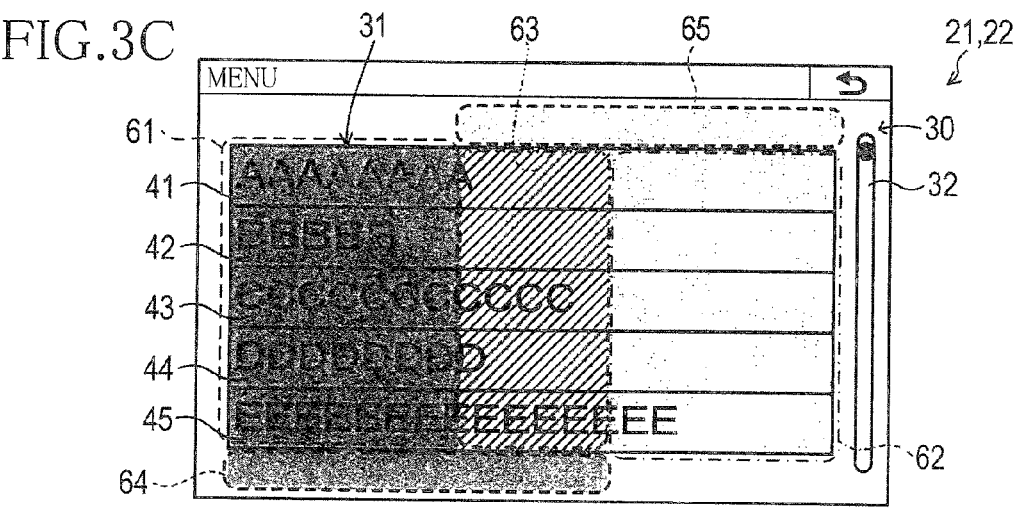

IMAGE-DISPLAY CONTROL SYSTEM, IMAGE-DISPLAY CONTROL METHOD, AND NON-TRANSITORY COMPUTER-READABLE STORAGE MEDIUM STORING IMAGE-DISPLAY CONTROL PROGRAM

CROSS REFERENCE TO RELATED APPLICATION

The present application claims priority from Japanese Patent Application No. 2012-200501, which was filed on Sep. 12, 2012, the disclosure of which is herein incorporated by reference in its entirety.

BACKGROUND

The present invention relates to an image-display control system for controlling an image to be displayed on a display. The invention further relates to an image-display control method and a non-transitory computer-readable storage medium in which an image-display control program is stored.

A display equipped with a touch panel is commonly used as a user interface (hereinafter abbreviated as "UI" where appropriate) for permitting a user to visually recognize or select a plurality of functions, setting items, and so on, in various information processing apparatus such as a multi-function peripheral and a mobile information terminal (e.g., PDA). One of the most typical examples of such a UI is the following structure. A screen including a plurality of object images indicative of various setting items and the like are displayed on a display in the form of a list. The display is configured to accept a user's operation for selecting a certain one of the object images and a user's another operation for scrolling the screen.

In such a UI, when the user touches a desired position on the display by a pointer (pointing tool) such as a finger, a stylus, or the like, the object image that is being displayed at the touched position is selected and process corresponding to the selected object image is executed. On the other hand, when the user moves (drags) the pointer in an arrangement direction in which the object images are arranged in the list, with the display kept touched by the pointer, the list of the object images displayed on the display is scrolled in a direction in which the user moved the pointer. In other words, both of a tap operation and a drag operation can be accepted for the same one object image. In general, the tap operation and the drag operation are distinguished from each other on the basis of whether an amount of the movement of a touch point on the display by the pointer is equal to or greater than a prescribed threshold. In this respect, throughout the present specification, a touch operation that does not involve any movement of a position of a touch on the display is referred to as a tap operation where appropriate, for the sake of convenience.

SUMMARY

Although both the tap operation and the drag operation are available in the UI, a process not intended by the user may be executed depending upon a user's operation condition. For instance, despite the user has touched, with his/her finger, a certain object image for selection, the finger may unintentionally move with the finger kept touched the display when the object image is touched, thereby causing the list to be scrolled contrary to the user's intention.

To prevent the tap operation from being erroneously judged as the drag operation as described above, it may be determined whether it is the drag operation based on the greater threshold of the movement amount of the touch point. However, the greater the threshold is, the worse the scrolling operability is. In this case, the drag operation may be erroneously judged as the tap operation due to a shortage in the amount of the movement even though the user intended to do the drag operation for scrolling.

The description of the present application may enable a user to easily obtain an intended operation result without suffering from deterioration in operability for the user, in a UI configured to accept both the tap operation and the drag operation.

The object indicated above may be attained according to a first aspect of the present invention, which provides, an image-display control system comprising: a display including a display area; a touch panel disposed over the display; a processor coupled with the display and the touch panel; and a memory storing instructions that, when executed by the processor, cause the image-display control system to: display a plurality of object images arranged in a first direction in the display area of the display, each of the plurality of object images having a unique process assigned; determine a touch and a position of the touch while the pointer touches the display area; define a first operation region and a second operation region in the display area, wherein the first operation region and the second operation region are arranged in a second direction orthogonal to the first direction, wherein the first operation region is not defined in the identical position to the second operation region and wherein at least a part of each of the plurality of object images is displayed in the first operation region and the second operation region; when determined the touch in the first operation region, execute the unique process assigned for one of the plurality of object images displayed at a position of the touch; and when determined the touch in the second operation region and when determined that a position of the touch is moving in the first direction while keeping the touch, scroll the plurality of object images in the first direction.

The object indicated above may be attained according to a second aspect of the present invention, which provides, a method of controlling an image to be displayed on a display including a display area, comprising the steps of: displaying a plurality of object images arranged in a first direction in the display area of the display, each of the plurality of object images having a unique process assigned; defining a first operation region and a second operation region in the display area, wherein the first operation region and the second operation region are arranged in a second direction orthogonal to the first direction, wherein the first operation region is not defined in the identical position to the second operation region; executing the unique process assigned for one of the plurality of object images displayed at a position of the touch, when determined the touch in the first operation region; and scrolling the plurality of object images in the first direction, when determined the touch in the second operation region and when determined that a position of the touch is moving in the first direction while keeping the touch.

The object indicated above may be attained according to a third aspect of the present invention, which provides, a non-transitory computer-readable storage medium in which is stored an image-display control program to be executed by a computer of an image-control system comprising: a display including a display area; a touch panel disposed over the display; a processor provided in the computer and coupled with the display and the touch panel; and a memory storing instructions included in the image-display control program that, when executed by the processor, cause the image-display control system to: display a plurality of object images arranged in a first direction in the display area of the display, each of the plurality of object images having a unique process assigned; determine a touch and a position of the touch while the pointer touches the display area; define a first operation region and a second operation region in the display area wherein the first operation region and the second operation region are arranged in a second direction orthogonal to the first direction, wherein the first operation region in not defined in the identical position to the second operation region and wherein at least of part of such that each of the plurality of object images is displayed in the first operation region and the second operation region; when determined the touch in the first operation region, execute the unique process assigned for one of the plurality of object images displayed at a position of the touch; and when determined the touch in the second operation region and when determined that a position of the touch is moving in the first direction while keeping the touch, scroll the plurality of object images in the first direction.

The image-display control system indicated above is realized by permitting the instructions described above to be executed by the processor according to a prescribed program.

BRIEF DESCRIPTION OF THE DRAWINGS

The above and other objects, features, advantages and technical and industrial significance of the present invention will be better understood by reading the following detailed description of embodiments of the invention, when considered in connection with the accompanying drawings, in which:

FIG. 2A is an initial screen example, FIG. 2B is a screen example when a tap region is tapped by a pointer, and FIG. 2C is a screen example when a scroll region is dragged in a scroll direction by the pointer;

FIGS. 3A-3C are views for explaining screen examples of the LCD, and more specifically, FIG. 3A shows a screen example in which a width of each region is changed, FIG. 3B shows a screen example in which the two regions are switched with each other, and FIG. 3C is an initial screen example in which the tap region and the scroll region partially overlap;

DETAILED DESCRIPTION OF THE EMBODIMENTS

There will be hereinafter explained embodiments of the present invention while giving concrete examples.

Figure 1A:
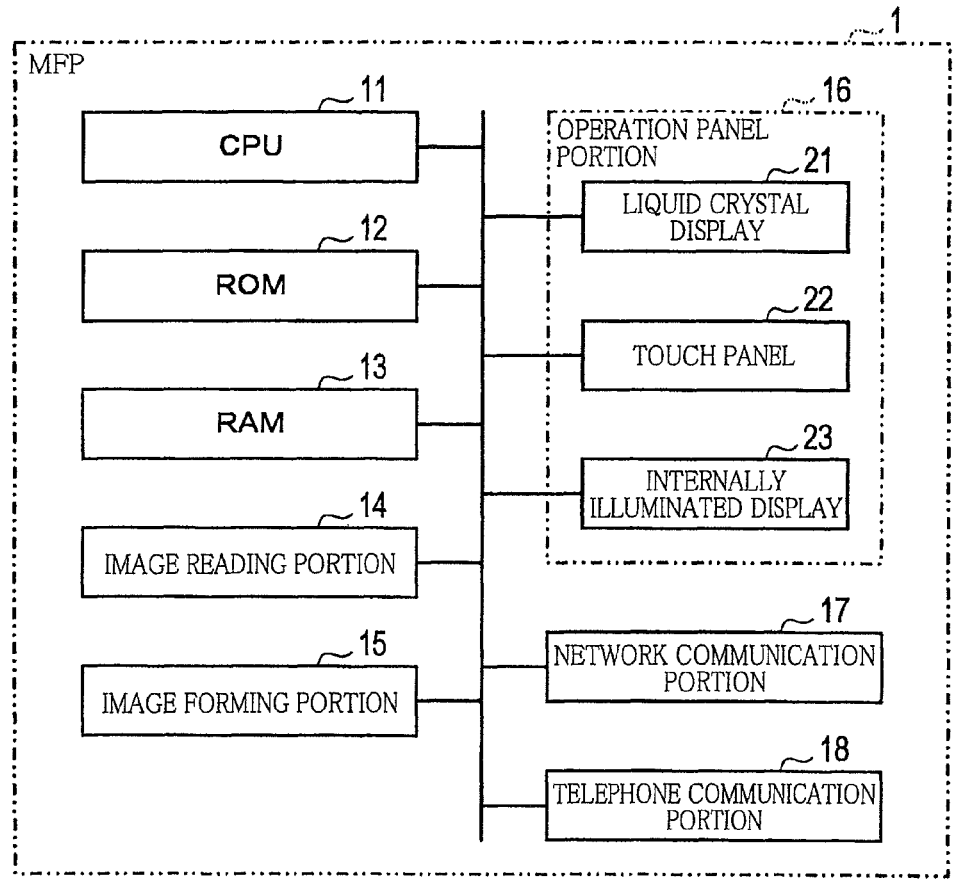
FIG. 1A is a view schematically showing a structure of an MFP according to one embodiment of the invention and FIG. 1B is a plan view of an operation panel portion.

As shown in FIG. 1A, a multifunction peripheral (MFP) 1 according to the present embodiment includes a CPU 11, a ROM 12, a RAM 13, an image reading portion 14, an image forming portion 15, an operation panel portion 16, a network communication portion 17, and a telephone communication portion 18.

The CPU 11 is configured to execute a control of various portions in the MFP 1 and various calculation according to various control programs stored in the ROM 12. The RAM 13 is configured to be directly accessible from the CPU 11. The RAM 13 is also a temporal storage area for temporarily storing various coordinates and various process states to be set when various process (that will be later explained) is executed, various processing directions, various events to be issued, and so on.

The image reading portion 14 is configured to read an image of a document by an image sensor and to generate image data indicative of the image. The image forming portion 15 is configured to record an image on a sheet-like recording medium such as a recording sheet. An example of the network communication portion 17 is a network interface card. An example of the telephone communication portion 18 is a modem. The modem is used in telephone communication and facsimile communication through a telephone network.

The operation panel portion 16 includes a liquid crystal display (LCD) 21, a touch panel 22, and an internally illuminated display 23 that are disposed as described below.

The LCD 21 includes an LCD module capable of displaying an arbitrary image in full color. There are displayed, on the LCD 21, various sorts of information such as various functions and an operating status of the MFP 1. For instance, there is displayed, on the LCD 21, a menu-list image 31 including a plurality of list-item images 41, 42, . . . , as shown in FIGS. 2 and 3. Each of the list-item images 41, 42, . . . is indicative of a certain setting item or function. In a state in which the menu-list image 31 is displayed, a user is allowed to select any one of the list-item images 41, etc., by performing a particular tap operation and to cause the menu-list image 31 to be scrolled by performing a particular drag operation in a particular arrangement direction in which the list-item images 41, 42, . . . are arranged. Each of the list-item images 41, 42, . . . is one example of an object image in the present invention.

Figure 1B:
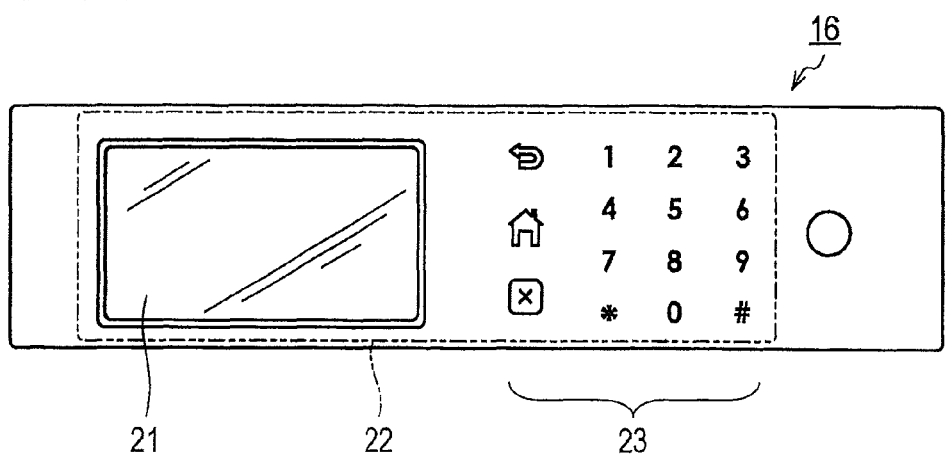

As shown in FIG. 1B, the touch panel 22 is a transparent film-like input device, such as capacitive touch screen, that can detect a touch operation by a pointer such as a finger or a stylus, in a well-known capacitive sensing technology. The touch panel 22 is disposed so as to be superposed on display surfaces of the LCD 21 and the internally illuminated display 23. As shown in FIG. 1B, the internally illuminated display 23 displays thereon images indicative of a numeric keypad and some operation buttons.

In the present embodiment, when a touch by the pointer is detected by the touch panel 22, a touch detection signal indicative of coordinates of a position of the touch is outputted from the touch panel 22 to the CPU 11. The CPU 11 is configured to execute various process that will be later explained, on the basis of the touch detection signal.

Next, there will be explained in detail what is displayed when the menu-list image 31 is shown on the LCD 21 and how a user's operation is accepted by the MFP 1, with reference to screen examples shown in FIGS. 2 and 3.

In the MFP 1 of the present embodiment, an initial screen (shown in FIG. 2A) of the menu-list image 31 including the plurality of list-item images 41, 42, 43, 44, 45, . . . is displayed in a display area 30 of the LCD 21 in various situations such as a situation in which a certain function is selected and a situation in which various setting items are set in image reading by the image reading portion 14.

More specifically, the menu-list image 31 includes the plurality of list-item images 41, etc., that are arranged in the particular arrangement direction. In the screen example of FIG. 2A, the arrangement direction is an up-down direction in FIG. 2A. Hereinafter, the arrangement direction is referred to as a "scroll direction" where appropriate. In the present embodiment, more than six list-item images are arranged although a particular number of the list-item images (e.g., five list-item images in the present embodiment) among the plurality of list-item images are displayed in the display area 30. A user can understand, by a scroll-position indication bar 32 that is displayed at a right end of the display area 30, where the five list-item images that are currently being displayed are located among all of the list-item images that can be displayed.

Each of the list-item images 41, etc., contains a character string that indicates setting details or a function corresponding to the associated list-item image. In each character string, characters are arranged from a leftmost end toward a right end in a left-right direction of the screen (i.e., an orthogonal direction to the arrangement direction). The user can recognize, when looking at the character strings, what function is implemented by tapping a certain list-item image. In the display area 30, x-y coordinates are set. That is, an x-axis is set in the left-right direction of the screen while a y-axis is set in the up-down direction of the screen. The scroll direction is identical to the up-down direction. An origin of the x-y coordinates may be suitably determined.

In a state in which the initial screen is displayed, when the user taps a desired list-item image with the pointer such as a finger, a function corresponding to the tapped list-item image can be implemented. Further, when the user drags the pointer in the display area 30 in the arrangement direction, the menu-list image 31 can be scrolled in the dragged direction. In detail, various touch operations such as the tap operation and the drag operation by the pointer are realized via a touch on the touch panel 22. Accordingly, in the following explanation, each of "tap (operation)", "drag (operation)", and "flick (operation)" means an operation on the touch panel 22.

In the present embodiment, not every tap operation performed by tapping any portion in the list-item image is accepted, namely, a function corresponding to the list-item image is not always realized by a tap operation on any portion in the list-item image. Similarly, not every drag operation performed by dragging any portion in the display area 30 causes the menu-list image 31 to be scrolled. In the present embodiment, there are individually set, in the display area 30, a region in which the tap operation is accepted and a region in which the drag operation is accepted.

More specifically, the entirety of the menu-list image 31 in the display area 30 is divided in two regions in the left-right direction, i.e., a tap region 51 on the left side and a scroll region 52 on the right side. The tap region 51 is one example of a first operation region in the present invention. The scroll region 52 is one example of a second operation region in the present invention. In each of the list-item images 41, etc., a left-side portion thereof is disposed in the tap region 51 while a right-side portion thereof is disposed in the scroll region 52. These two regions 51, 52 are set within the menu-list image 31 without extending beyond the menu-list image 31 and there is no clearance between the two regions 51, 52. In the example shown in FIG. 2, however, for clarifying distinction between the two regions 51, 52, the broken line showing each region 51, 52 is illustrated so as to extend beyond the menu-list image 31, and the two regions 51, 52 are illustrated so as to be slightly spaced apart from each other. However, it is not essential that the two regions 51, 52 be set within the menu-list image 31 or be adjacent to each other with no clearance therebetween.

In the present embodiment, the tap region 51 and the scroll region 52 are displayed in mutually different colors in a particular operation state, such that the two regions 51, 52 can be visually distinguished from each other and a boundary therebetween is easily recognized. A situation in which the two regions are displayed in mutually different colors will be described later. The two regions 51, 52 may be continuously displayed in mutually different colors regardless of the operation state as long as the menu-list image 31 is being displayed. On the contrary, the two regions 51, 52 may be displayed in the same color.

Widths of the respective regions 51, 52 in the initial screen may be determined in various ways. For instance, the widths may be set to respective default values or may be set such that the last state when a preceding menu-list image 31 was being displayed is reproduced. The width of each of the regions 51, 52 is a dimension thereof in the orthogonal direction that is orthogonal to the arrangement direction.

In the screen examples shown in FIG. 2, FIGS. 3A and 3B, the two regions 51, 52 are adjacent to each other in the left-right direction (in the orthogonal direction that is orthogonal to the scroll direction) without overlapping each other. The tap region and the scroll region may partially overlap each other, as shown in FIG. 3C. In the example shown in FIG. 3C, there is also set a common region 63 in which each of the tap operation and the drag operation is acceptable.

Figure 2A:
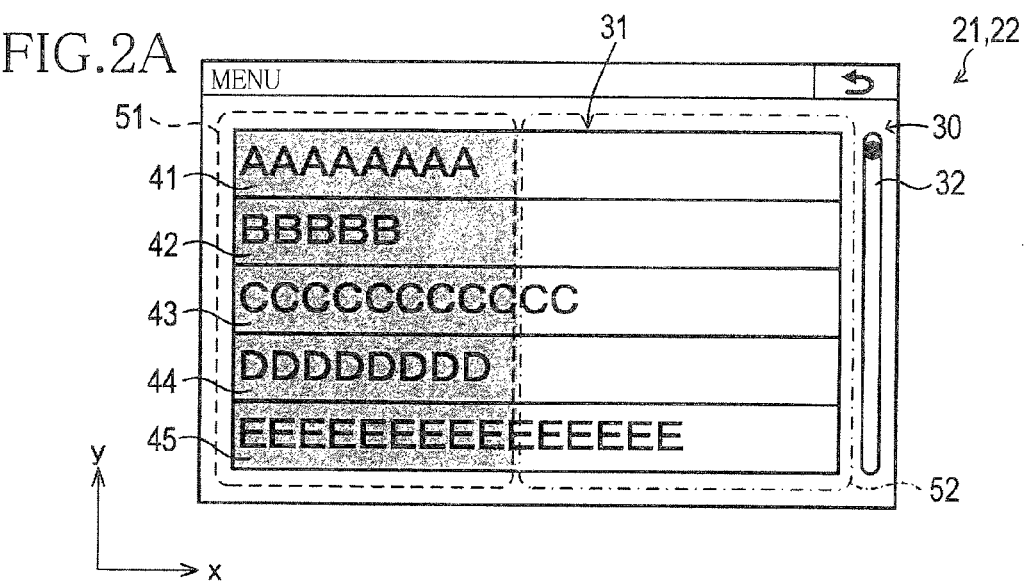
FIGS. 2A-2C are views for explaining screen examples of a liquid crystal display (LCD), and more specifically.

In the screen example of the display area 30 shown in FIG. 2A, where the user taps a desired position in the tap region 51 with a pointer such as his/her finger, it is determined that the tap operation has been performed and there is executed process predetermined for the list-item image that is being displayed at the tapped position. The process will be hereinafter referred to as the "corresponding process" where appropriate. In the present embodiment, timing at which the corresponding process is actually executed is not the exact time when the desired position is touched, but the time when the pointer is separated from the touch panel 22 after the desired position has been touched. It is, however, not essential that the corresponding process be executed at timing when the pointer is separated from the touch panel 22. For instance, the corresponding process may be executed at timing when the pointer has come into contact with the touch panel 22 or at certain timing between when the pointer has come into contact with the touch panel 22 and when the pointer is separated therefrom.

Figure 2B:
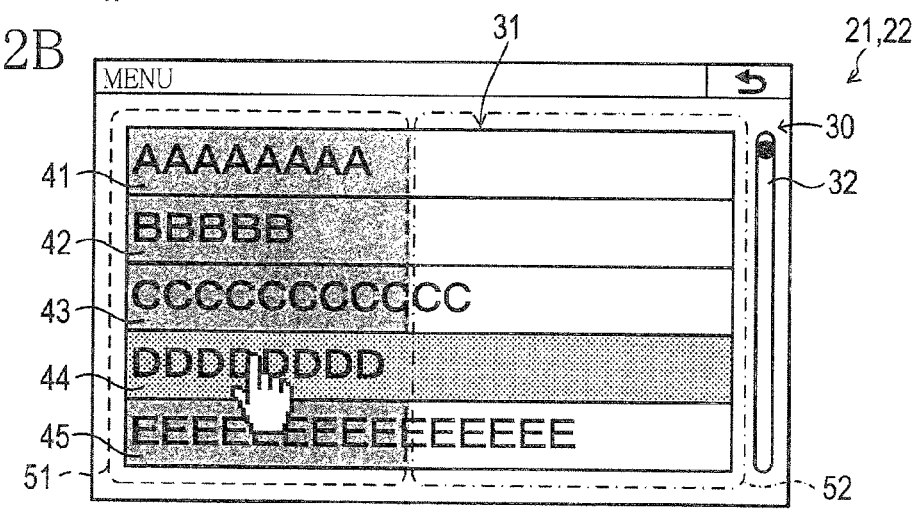

FIG. 2B shows an example of the display region 30 that displays a screen in which the pointer has tapped the list-item image 44 that is the fourth list-item image from the top in the tap region 51. In this instance, the CPU 11 determines that the list-item image 44 has been tapped on the basis of a tap detection signal indicative of coordinates of a position tapped by the pointer (i.e., tap position) and executes the corresponding process predetermined for the list-item image 44. Where the pointer taps a certain position in the tap region 51, the list-item image that is being displayed at the position tapped by the pointer may be highlighted in such a way that the list-item image is displayed in a different color from the other list-item images.

In the screen example of the display area 30 shown in FIG. 2A, when the user touches any position in the scroll region 52 with the pointer such as his/her finger, keeps the touch and subsequently moves the pointer in the scroll direction, it is determined that the drag operation has been performed. In this instance, the menu-list image 31 is scrolled by a certain amount, which is determined in accordance with an amount of the movement of the pointer in the scroll direction. In other words, the certain amount is determined in accordance with a distance of the movement of the pointer in the y-axis direction.

Figure 2C:
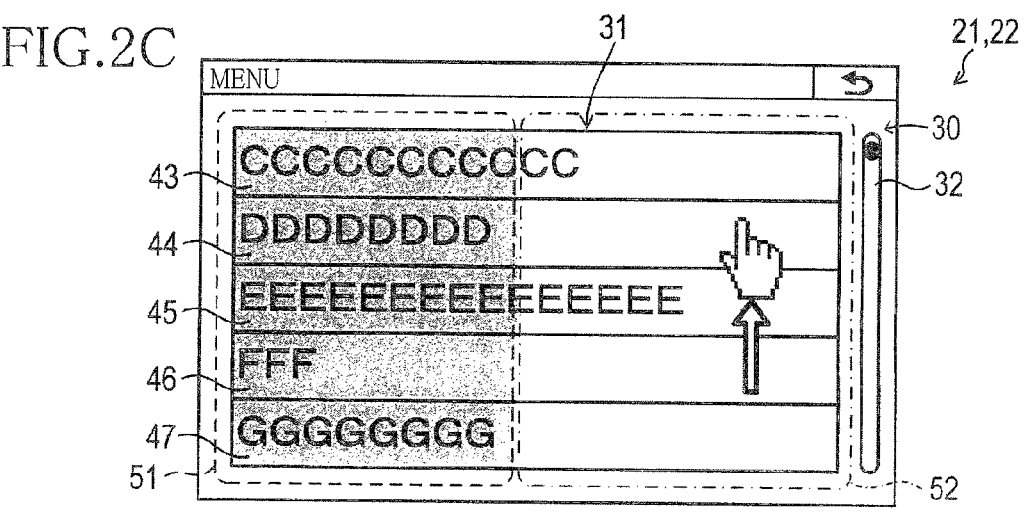

FIG. 2C is a screen example showing a state in which the menu-list image 31 is scrolled by an amount corresponding to a height of two list-item images due to the user's drag operation in the scroll region 52 with the pointer. In this instance, the CPU 11 determines that the drag operation has been performed on the basis of a continuous change of the coordinates of the touch position of the pointer. And then, the menu-list image 31 is scrolled by an amount in accordance with an amount of the drag operation (i.e., the movement distance of the pointer in the y-axis direction) in a direction of the drag operation (e.g., in the upward direction in FIG. 2C).

In the initial screen shown in FIG. 2A, the user can enlarge or reduce the width of each of the two regions 51, 52, (i.e., the width thereof in the orthogonal direction). To be more specific, when the user drags the pointer in one of the two regions 51, 52 in the width direction thereof (i.e., in the orthogonal direction), the width of the one of the two regions 51, 52 on which the drag operation has been performed changes in a direction in which the drag operation has been performed. For instance, where the user drags the pointer in the scroll region 52 in a leftward direction, the width of the scroll region 52 is enlarged in the leftward direction, as shown in FIG. 3A. In this instance, the width of the tap region 51 is reduced in the leftward direction by an amount corresponding to the enlargement amount of the scroll region 52. The enlargement amount and the reduction amount of the regions 51, 52 correspond to the movement amount of the pointer in the drag operation, more specifically, the movement distance of the pointer in the x-axis direction. In other words, the width of each region 51, 52 is changed by an amount corresponding to the movement distance in the x-axis direction.

Contrary to the example shown in FIG. 3A, when the user drags the pointer in the scroll region 52 in a rightward direction, the width of the scroll region 52 is reduced in the rightward direction and the width of the tap region 51 is enlarged in the rightward direction by an amount corresponding to the reduction amount.

The width of each region 51, 52 may be enlarged or reduced also by dragging the pointer in the press region 51. For instance, when the user drags the pointer in the press region 51 in the rightward direction, the width of the press region 51 is enlarged in the rightward direction and the width of the scroll region 52 is reduced in the rightward direction by an amount corresponding to the enlargement amount. In this respect, each of the two regions 51, 52 is one example of a range-variable operation region.

In the initial screen shown in FIG. 2A, the user can switch the position of the tap region 51 and the position of the scroll region 52 with each other. When the user flicks one of the two regions 51, 52 toward the other of the two regions 51, 52, the two regions 51, 52 switch each other. The screen example shown in FIG. 3B shows a state in which the scroll region 52 and the tap region 51 have switched each other, namely, the scroll region 52 has been moved to the left side while the press region 51 has been moved to the right side, after the user has performed a flick operation on the initial screen shown in FIG. 2A so as to flick the scroll region 52 with the pointer in the leftward direction toward the press region 51.

In the present embodiment, it is determined that the flick operation has been performed when a position of a touch by the pointer has moved, while keeping the touch, at a high speed by a certain distance beyond a distance of 30 dots within a particular short period, which is a touch-state detecting period described later. Here, 30 dots may vary depending on resolution of the LCD 21.

In each of the screen examples shown in FIGS. 2A-2C and FIGS. 3A and 3B, the press region 51 and the scroll region 52 are adjacent to each other without overlapping. The regions 51, 52 may partially overlap each other.

FIG. 3C shows a screen example in which a common region 63 is defined. In the common region 63, both of the tap operation and the drag operation are acceptable. In the screen example shown in FIG. 3C, there are set, in the display area 30, a tap-only region 61, a scroll-only region 62, the common region 63, a tap-region-size change region 64, and a scroll-region-size change region 65.

In the tap-only region 61, the tap operation is acceptable whereas the drag operation in the scroll direction is not acceptable. In the scroll-only region 62, the drag operation in the scroll direction is acceptable whereas the press operation is not acceptable. In the common region 63, both of the drag operation in the scroll direction and the press operation are acceptable. All of the tap-only region 61, the scroll-only region 62, and the common region 63 are defined in the menu-list image 31. In other words, the entirety of the menu-list image 31 is divided into these three regions 61, 62, 63.

In both of the press-only region 61 and the common region 63, the tap operation is acceptable. Accordingly, the tap-only region 61 and the common region 63 as a whole are equivalent to the tap region 51 in the screen example shown in FIG. 2. Therefore, in the following explanation, with regard to the screen example shown in FIG. 3C, the tap-only region 61 and the common region 63 may be collectively referred to as the tap region (as one example of a first operation region in the present invention). Similarly, in both of the scroll-only region 62 and the common region 63, the drag operation in the scroll direction is acceptable. Accordingly, the scroll-only region 62 and the common region 63 as a whole are equivalent to the scroll region 52 in the screen example shown in FIG. 2. Therefore, in the following explanation, with regard to the screen example shown in FIG. 3C, the scroll-only region 62 and the common region 63 may be collectively referred to as the scroll region (as one example of a second operation region in the present invention).

The tap-region-size change region 64 and the scroll-region-size change region 65 are independently defined in the display area 30 so as to be different from the region of the menu-list image 31. In the present embodiment, it may be available that combination of the tap-only region 61, the common region 63, and the tap-region-size change region 64 is equivalent to the tap region, which is the first operation region. It may also be available that combination of the scroll-only region 62, the common region 63, and the scroll-region-size change region 65 is equivalent to the scroll region, which is the second operation region.

The tap-region-size change region 64 is defined so as to be adjacent to a lower portion of the tap region at a lower left side of the menu-list image 31. In the tap-region-size change region 64, the drag operation for enlarging or reducing the width of only the tap region is accepted. When the user performs, in the tap-region-size change region 64, the drag operation in the rightward direction, the width of the tap region is enlarged in the rightward direction. In this instance, however, the width of the scroll region does not change. Accordingly, in actuality, the width of the tap-only region 61 does not change, and the width of the common region 63 is enlarged in the rightward direction. As a result, the width of the scroll-only region 62 is reduced in the rightward direction by an amount corresponding to the enlargement amount of the common region 63.

The scroll-region-size change region 65 is defined so as to be adjacent to an upper portion of the scroll region at an upper right side of the menu-list image 31. In the scroll-region-size change region 65, the drag operation for enlarging or reducing the width of only the scroll region is accepted. When the user performs, in the scroll-region-size change region 65, the drag operation in the leftward direction, the width of the scroll region is enlarged in the leftward direction. In this instance, however, the width of the press region does not change. Accordingly, in actuality, the width of the scroll-only region 62 does not change, and the width of the common region 63 is enlarged in the leftward direction. As a result, the width of the press-only region 61 is reduced in the leftward direction by an amount corresponding to the enlargement amount of the common region 63.

Where the drag operation is performed in the common region 63 in one of the leftward direction and the rightward direction, both of the width of the tap region and the width of the scroll region change in the one of the leftward direction and the rightward direction in which the drag operation is performed. That is, when the drag operation is performed in the common region 63 in the leftward direction, the press region is reduced in the leftward direction while the scroll region is enlarged in the leftward direction. The change in the width of the press region and the change in the width of the scroll region is mutually the same. Accordingly, as a result, the common region 63 moves, while keeping the width of the common region 33, in the leftward direction, and the scroll-only region 62 is enlarged in the leftward direction while the tap-only region 61 is reduced in the leftward direction, by an amount corresponding to the movement amount of the common region 63. In this respect, each of the above-indicated tap region and scroll region may be one example of a range-variable operation region in the present invention.

The tap region and the scroll region can be switched by the flick operation in a lateral direction in the screen example shown in FIG. 3C as well. When the flick operation is performed in the scroll-only region 62 or in the common region 63 in the leftward direction, the tap region and the scroll region are switched with each other. In this instance, the tap-region-size change region 64 moves rightward in association with the rightward movement of the tap region, and the scroll-region-size change region 65 moves leftward in association with the leftward movement of the scroll region.

Referring next to FIGS. 4-10, there will be explained various control process executed by the CPU 11 when the menu-list image 31 is displayed. The process of FIGS. 4-10 shows process executed in a case in which five regions 61-65 including the common region 63 are defined in the display area 30 as shown in FIG. 3C.

Figure 4:
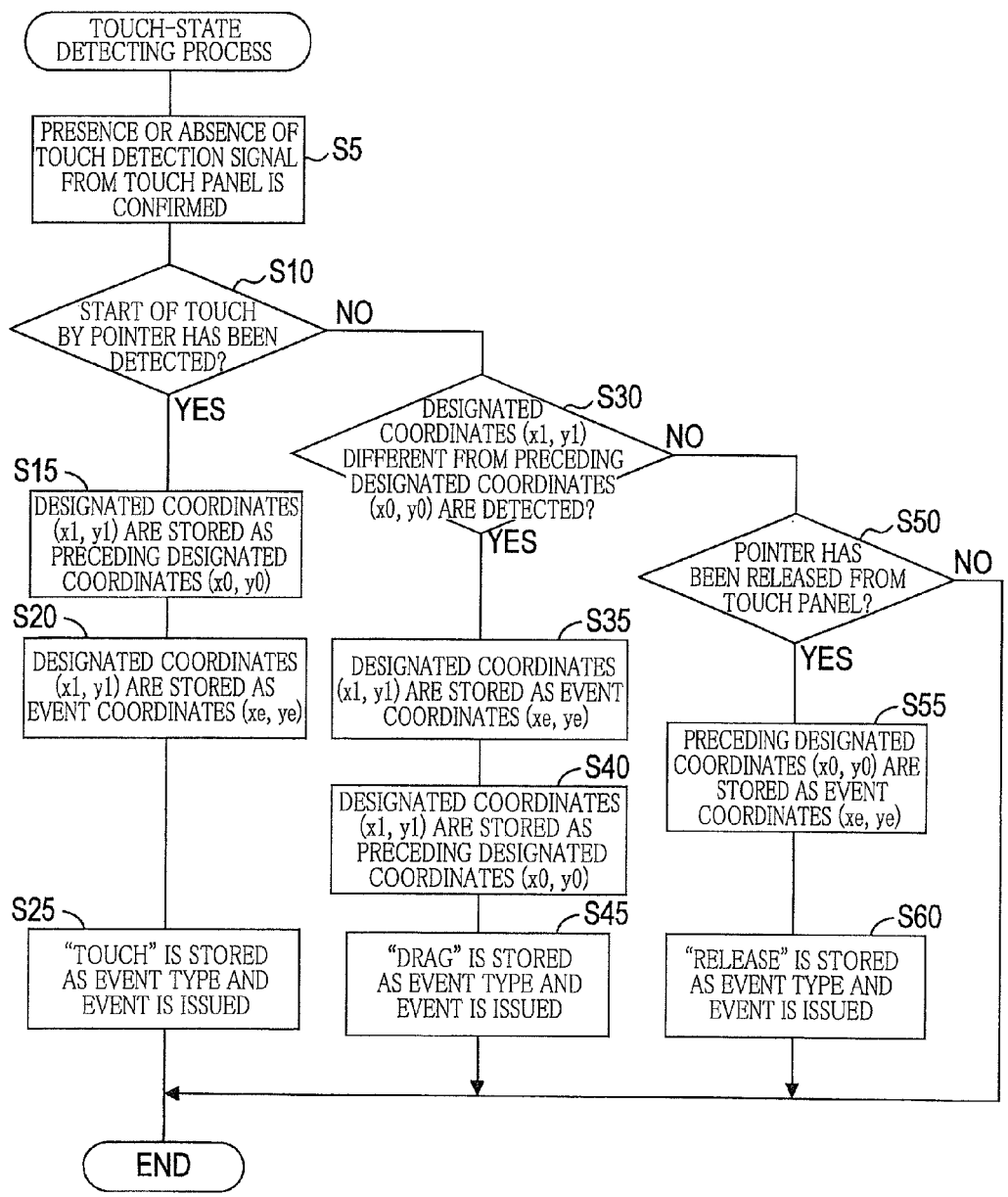
FIG. 4 is a flow chart of touch-state detecting process executed by a CPU of the MFP.
Figure 5:
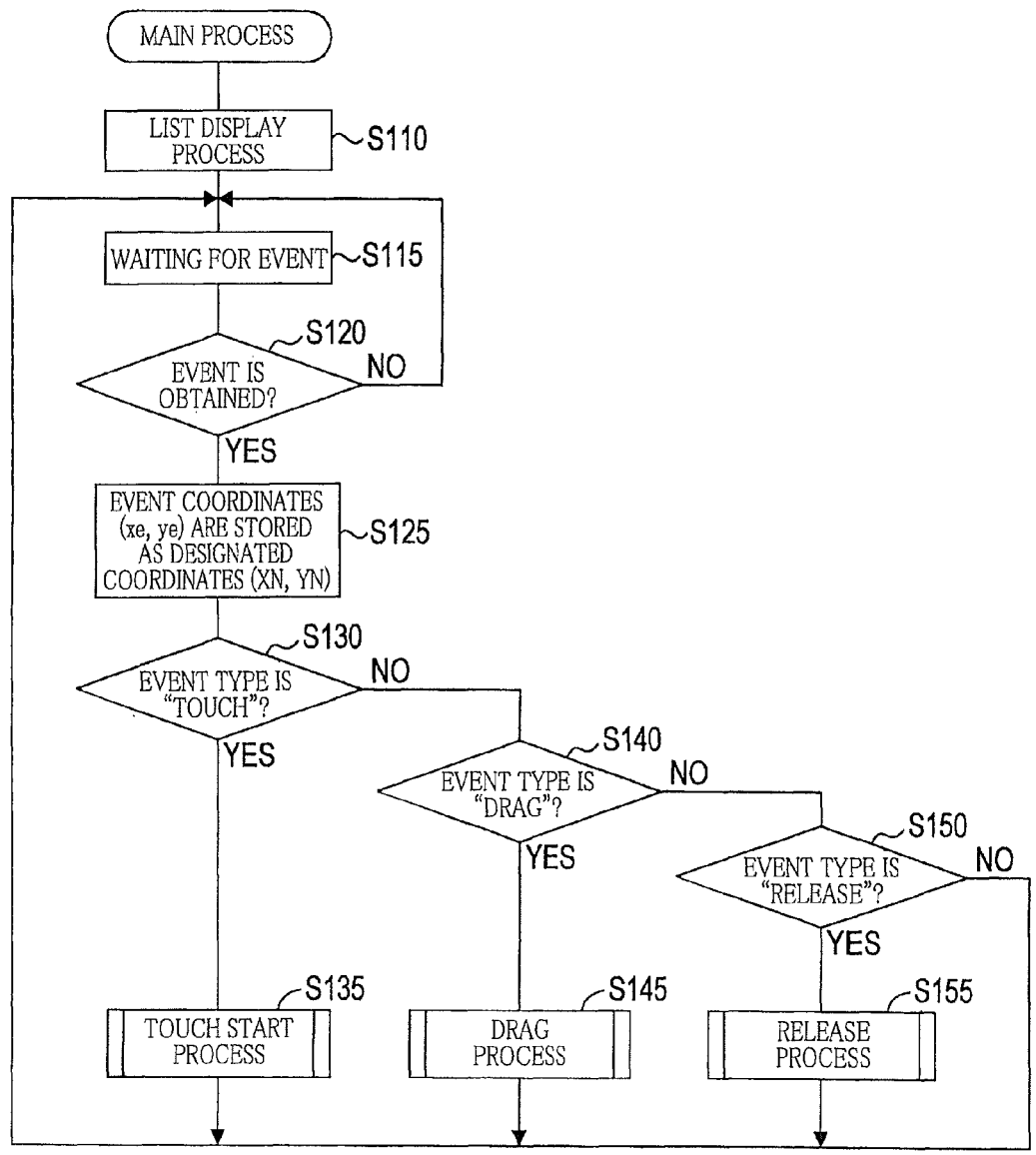
FIG. 5 is a flow chart of main process executed by the CPU of the MFP.

When the initial screen of the menu-list image 31 shown in FIG. 3C is displayed, after a startup of the MFP 1, in the course of various operations by the user, the CPU 11 executes touch-state detecting process shown in FIG. 4 and main process shown in FIG. 5 in parallel.

In the touch-state detecting process, the CPU 11 repeatedly executes the touch-state detecting process at particular time intervals, namely, at the particular touch-state detecting period. When the CPU 11 starts the touch-state detecting process, the CPU 11 initially confirms at S5 presence or absence of a touch detection signal sent from the touch panel 22. If the touch detection signal has been inputted from the touch panel 22, the CPU 11 obtains, as designated coordinates (x1, y1), coordinates of a touch position indicative of the touch detection signal.

On the basis of the result at S5, the CPU 11 determines at S10 whether or not a start of a touch by the pointer has been detected. More specifically, the CPU 11 determines the start of the touch is detected and causes the process to proceed to S15 in a case where the touch detection signal was not inputted at S5 in the preceding touch-state detecting process and the touch detection signal is inputted at S5 in the current touch-state detecting process.

At S15, the designated coordinates (x1, y1) detected at S5 are stored in the RAM 13 as preceding designated coordinates (x0, y0). Further, at S20, the designated coordinates (x1, y1) are stored in the RAM 13 as event coordinates (xe, ye). Subsequently, at S25, "touch" as an event type is stored in the RAM 13, an event "touch" is issued, and the touch-state detecting process ends. The issuance of the event "touch" means a state in which the pointer has started a touch on the touch panel 22.

In the determination at S10, in a case where the touch detection signal was inputted at S5 in the preceding execution of the touch-state detecting process and the touch detection signal is inputted at S5 also in the current execution of the process, the process proceeds to S30. This means that, although the pointer is touching on the touch panel 22, the touch is not currently started one but the touch is maintained from the preceding process. Further, if the touch detection signal is not inputted at S5, namely, if the pointer is not touching on the touch panel 22, the process proceeds from S10 to S30.

At S30, it is determined whether or not the designated coordinates (x1, y1) detected at S5 is different from the preceding designated coordinates (x0, y0). If it is determined that the designated coordinates (x1, y1) are different from the preceding designated coordinates (x0, y0), the designated coordinates (x1, y1) are stored in the RAM 13 at S35 as the event coordinates (xe, ye). Further, at S40, the designated coordinates (x1, y1) are stored in the RAM 13 as the preceding designated coordinates (x0, y0). Subsequently, at S45, "drag" as an event type is stored in the RAM 13, an event "drag" is issued. Then the touch-state detecting process ends. The issuance of the event "drag" means that the drag operation on the touch panel 22 by the pointer has been performed. In other words, the touch position has moved.

When the event "touch" was issued as a result of detection of the start of the touch in the preceding touch-state detecting process and the event "drag" is issued at S45 as a result of detection of a movement of the coordinates of the touch position in the current touch-state detecting process, there is also stored information representing that the drag operation is the first one performed after the start of the touch. The information is utilized at S320 in FIG. 7 that will be later explained.

At S30, if the designated coordinates (x1, y1) do not differ from the preceding designated coordinates (x0, y0), the process proceeds to S50. Also if the touch detection signal is not inputted at S5, the process proceeds from S30 to S50. At S50, it is determined whether or not the pointer has been released from the touch panel 22. In a case where the touch detection signal is inputted at S5, the pointer is still touching on the touch panel 22. In this instance, the touch-state detecting process ends. On the other hand, if the touch detection signal was inputted at S5 in the preceding touch-state detecting process, whereas the touch detection signal is not inputted at S5 in the current touch-state detecting process, it is determined that the pointer has been released from the touch panel 22, and the process proceeds to S55.

At S55, the preceding designated coordinates (x0, y0) are stored in the RAM 13 as the event coordinates (xe, ye). Subsequently, at S60, "release" as the event type is stored in the RAM 13, an event "release" is issued, and then the touch-state detecting process ends. The issuance of the event "release" means that the pointer has been released from the touch panel 22.

The touch-state detecting process explained above is repeatedly executed at an interval of the touch-state detecting period. Thus, every time the touch-state detecting process is executed, any one of the following (1)-(5) is determined: (1) whether the touch by the pointer on the touch panel 22 has been started; (2) whether the touched state is being maintained at the same position; (3) whether the drag operation is being performed: (4) whether the pointer has been released; and (5) a state in which the pointer is not in touch with the touch panel 22 is being maintained.

The main process of FIG. 5 will be next explained. When the CPU 11 starts the main process, the CPU 11 initially executes list display process at S110. More specifically, the CPU 11 causes the menu-list image 31 as shown in FIG. 3C to be displayed, as the initial screen, in the display area 30 of the LCD 21. In this instance, the regions 61-65 are initialized as shown in FIG. 3C.

At S115, the CPU 11 waits for any event. That is, the CPU 11 waits a predetermined time (e.g., 5 msec.) for issuance of any event. When an event is issued, the CPU 11 obtains the event. At S120, it is determined whether or not any event is obtained. If no event is obtained, the process returns to S115. If any event is obtained, the process proceeds to S125. At S125, the event coordinates (xe, ye) stored in the RAM 13 are stored as designated coordinates (XN, YN) in the RAM 13.

At S130, it is determined whether or not the event type is "touch". If the event type is "touch", the process proceeds to S135 to execute touch start process. If the event type is not "touch", it is determined at S140 whether or not the event type is "drag". If the event type is "drag", the process proceeds to S145 to execute drag process. If the event type is not "drag", it is determined at S150 whether or not the event type is "release". If the event type is not "release", the process returns to S115. If the event type is "release", the process proceeds to S155 to execute release process. The touch start process of S135, the drag process of S145, and the release process of S155 will be explained in order.

Figure 6:
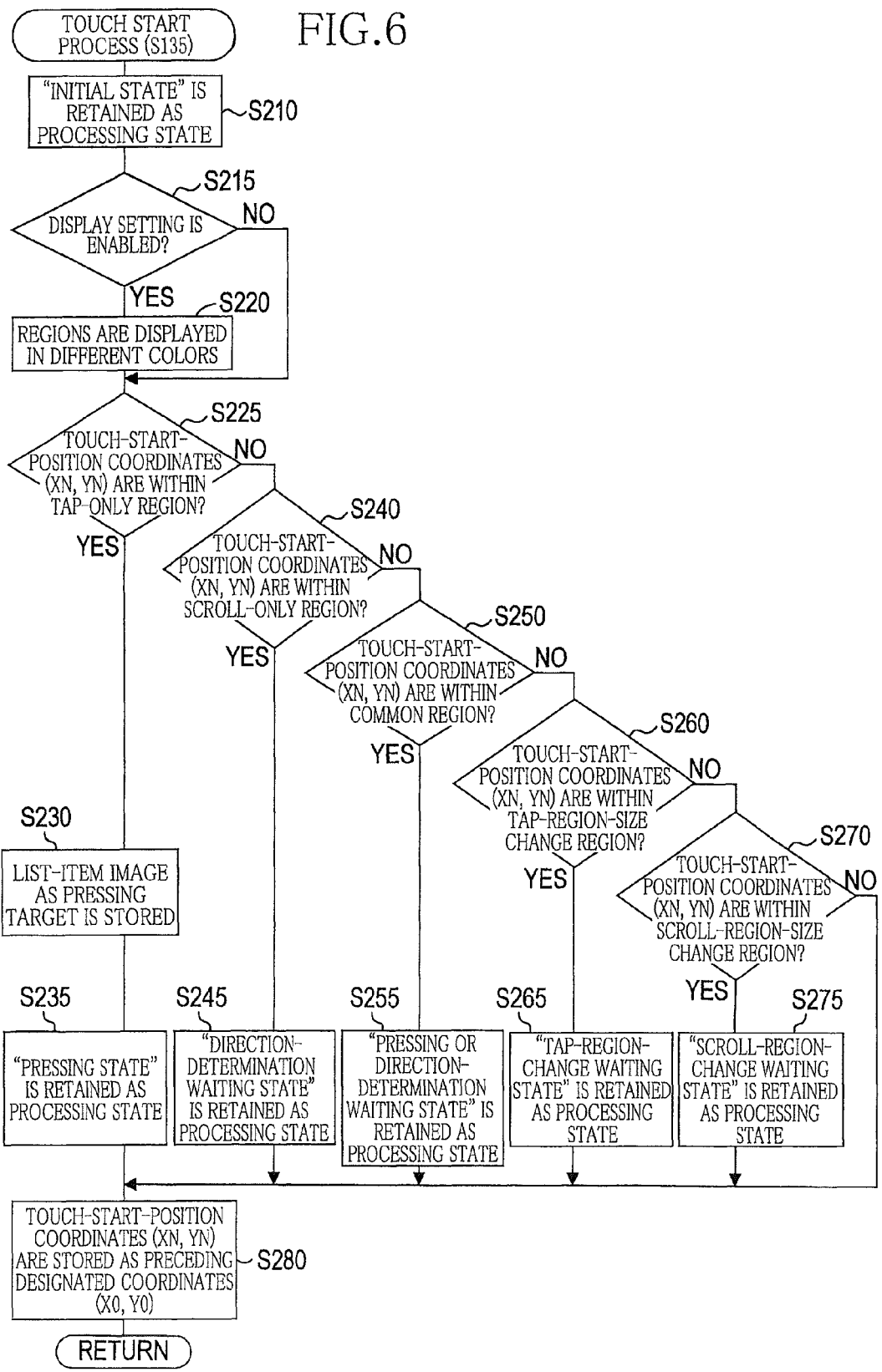
FIG. 6 is a flow chart showing details of touch start process of S135 in FIG. 5.

The touch start process of S135 will be explained with reference to FIG. 6. When the CPU 11 starts the touch start process shown in FIG. 6, the CPU 11 retains, at S210, "initial state" as a processing state, and the "initial state" is set and stored in the RAM 13. At S215, it is determined whether or not a display setting for displaying the tap region and the scroll region is enabled. When the display setting is enabled, the tap region and the scroll region are displayed in mutually different colors such that a user may visually understand the tap region and scroll region distinguished from each other. The user can set in advance the display setting enabled or not. In the screen example shown in FIG. 3C, the tap-only region 61 and the tap-region-size change region 64 are displayed in the same color that is different from colors for other regions 62, 63, 65. The scroll-only region 62 and the scroll-region-size change region 65 are displayed in the same color that is different from colors for other regions 61, 63, 64. The common region 63 is displayed in a color that is different from colors for other regions 61, 62, 64, 65. In other words, the display area 30 is color-coded in three different colors.

If it is determined at S215 that the display setting is not enabled, the process proceeds to S225. On the other hand, if it is determined at S215 that the display setting is enabled, the regions 61-65 are displayed, at S220, in the colors as described above.

At S225, it is determined whether or not touch-start-position coordinates (XN, YN), which is the designated coordinates at the time of detection of the start of the touch, are within the tap-only region 61. If the touch-start-position coordinates (XN, YN) are within the tap-only region 61, the list-item image as a pressing target is stored in the RAM 13 at S230, and "pressing state" is retained at S235 as the processing state. Then the process proceeds to S280. At S280, the touch-start-position coordinates (XN, YN) are stored in the RAM 13 as preceding designated coordinates (X0, Y0).

If it is determined at S225 that the touch-start-position coordinates (XN, YN) are not within the tap-only region 61, it is determined at S240 whether or not the touch-start-position coordinates (XN, YN) are within the scroll-only region 62. If it is determined at S240 the touch-start-position coordinates (XN, YN) are within the scroll-only region 62, "direction-determination waiting state" is retained at S245 as the processing state. Then the processing proceeds to S280.

If it is determined at S240 that the touch-start-position coordinates (XN, YN) are not within the scroll-only region 62, it is determined at S250 whether or not the touch-start-position coordinates (XN, YN) are within the common region 63. If it is determined at S250 that the touch-start-position coordinates (XN, YN) are within the common region 63, "pressing or direction-determination waiting state" is retained at S255 as the processing state. Then the processing proceeds to S280.

If it is determined at S250 that the touch-start-position coordinates (XN, YN) are not within the common region 63, it is determined at S260 whether or not the touch-start-position coordinates (XN, YN) are within the tap-region-size change region 64. If it is determined at S260 that the touch-start-position coordinates (XN, YN) are within the tap-region-size change region 64, "tap-region-change waiting state" is retained at S265 as the processing state. Then the processing proceeds to S280.

If it is determined at S260 that the touch-start-position coordinates (XN, YN) are not within the tap-region-size change region 64, it is determined at S270 whether or not the touch-start-position coordinates (XN, YN) are within the scroll-region-size change region 65. If it is determined at S270 that the touch-start-position coordinates (XN, YN) are not within the scroll-region-size change region 65, the processing proceeds to S280. If it is determined at S270 that the touch-start-position coordinates (XN, YN) are within the scroll-region-size change region 65, "scroll-region-change waiting state" is retained at S275 as the processing state. Then the processing proceeds to S280.

The drag process of S145 will be explained with reference to FIG. 7. When the CPU 11 starts the drag process, the CPU 11 determines at S310 a movement direction and a movement distance of the touch position of the pointer on the basis of the preceding designated coordinates (X0, Y0) and moved designated coordinates (XN, YN), which is the designated coordinates (XN, YN) stored at S125 of FIG. 5.

To be more specific, the direction in which the touch position of the pointer actually moved is broken into an x-axis component and a y-axis component. The lengths of the respective two components are compared, and the direction of a longer one of the two components is determined as the movement direction. Accordingly, the movement direction is a lateral direction (the left-right direction) when the x-axis component is longer. The movement direction is a vertical direction (the up-down direction or the scroll direction) when the y-axis component is longer. The movement distance is the length of the one of the x-axis component and the y-axis component in the distance by which the touch position of the pointer actually moved, the one of the x-axis component and the y-axis component being determined as the movement direction.

At S315, it is determined whether the processing state is "initial state" or not. If it is determined at S315 that the processing state is the initial state, the drag process ends. If it is determined at S315 that the processing state is not the initial state, it is determined at S320 whether or not the drag operation is the first one performed after the start of the touch. As described above, when the drag operation has been performed for the first time after the start of the touch, the information indicative that the drag operation is the first one performed after the start of the touch is already stored in the RAM 13. If it is determined at S320 that the drag operation is not the first one after the start of the touch, the processing proceeds to S340. If it is determined at S320 that the drag operation is the first one after the start of the touch, it is determined at S325 whether the movement direction is the vertical direction or the lateral direction. If it is determined at S325 that the movement direction is the vertical direction, "vertical direction" is retained at S330 in the RAM 13 as a processing direction. Then the process proceeds to S340. If it is determined at S325 that the movement direction is the lateral direction, "lateral direction" is retained at S335 in the RAM 13 as the processing direction. Then the process proceeds to S340.

Figure 8:
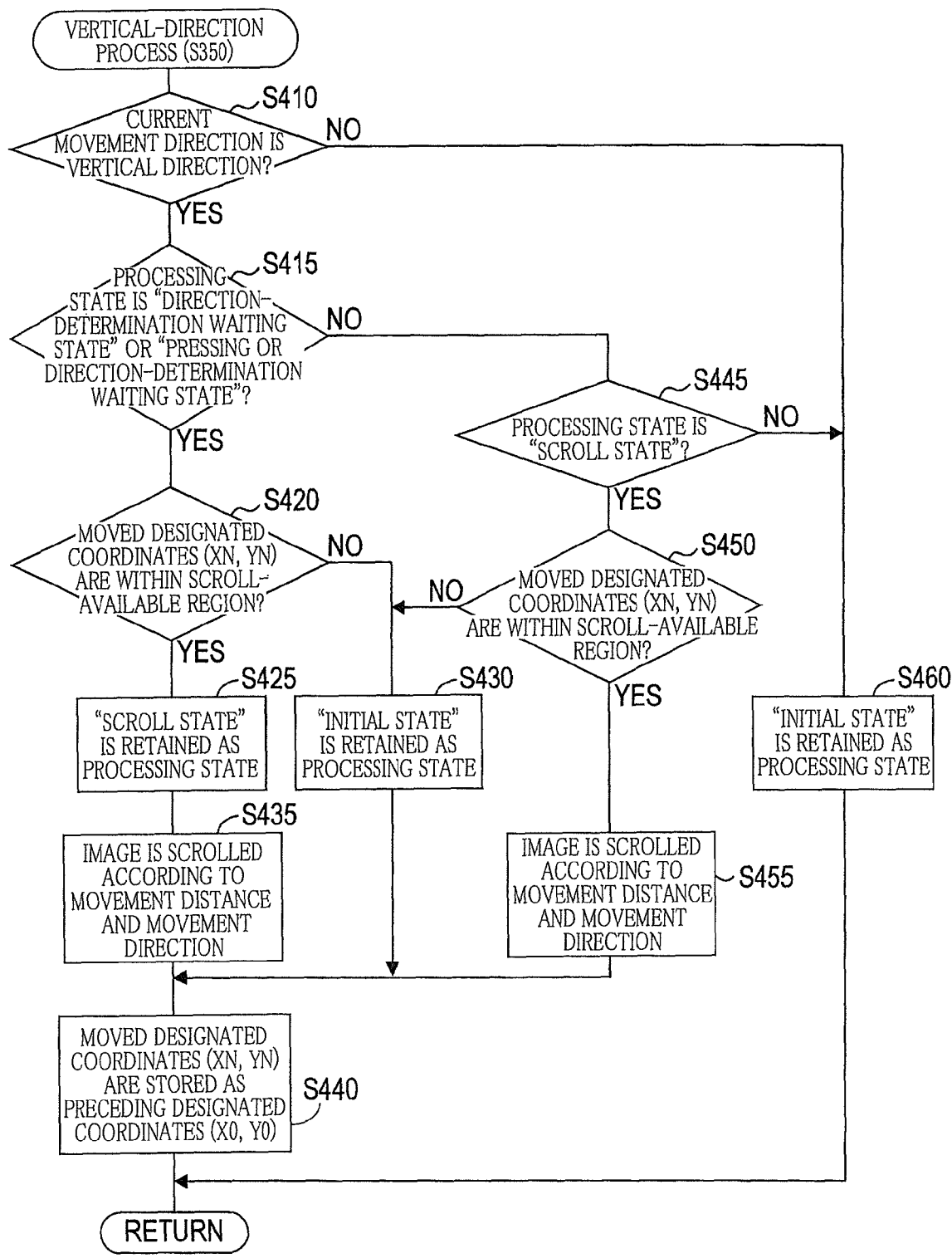
FIG. 8 is a flow chart showing details of vertical-direction process of S350 in FIG. 7.
Figure 9:
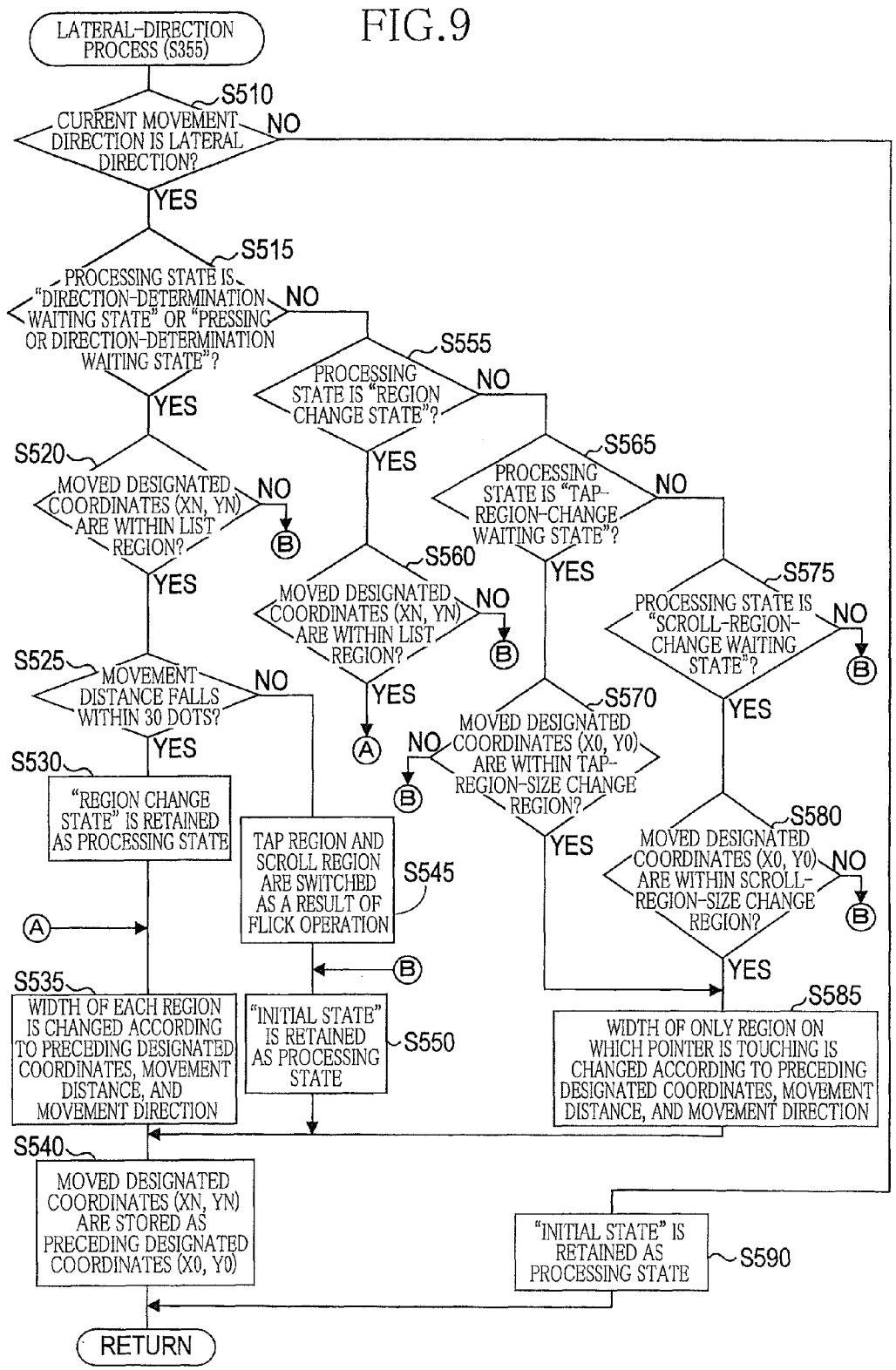
FIG. 9 is a flow chart showing details of lateral-direction process of S355 in FIG. 7.

At S340, it is determined whether or not the processing state is "pressing state". If it is determined at S340 that the processing state is the pressing state, the process proceeds to S360. If it is determined at S340 that the processing state is not the pressing state, it is determined at S345 whether or not the processing direction is "vertical direction". If it is determined at S345 that the processing direction is the vertical direction, the process proceeds to S350 for the vertical-direction process and then proceeds to S360. If it is determined at S345 that processing direction is the lateral direction, the process proceeds to S355 for the lateral-direction process and then proceeds to S360. At S360, the moved designated coordinates (XN, YN) are stored in the RAM 13 as the preceding designated coordinates (X0, Y0). The vertical-direction process of S350 is shown in FIG. 8. The lateral-direction process of S355 is shown in FIG. 9.

Figure 7:
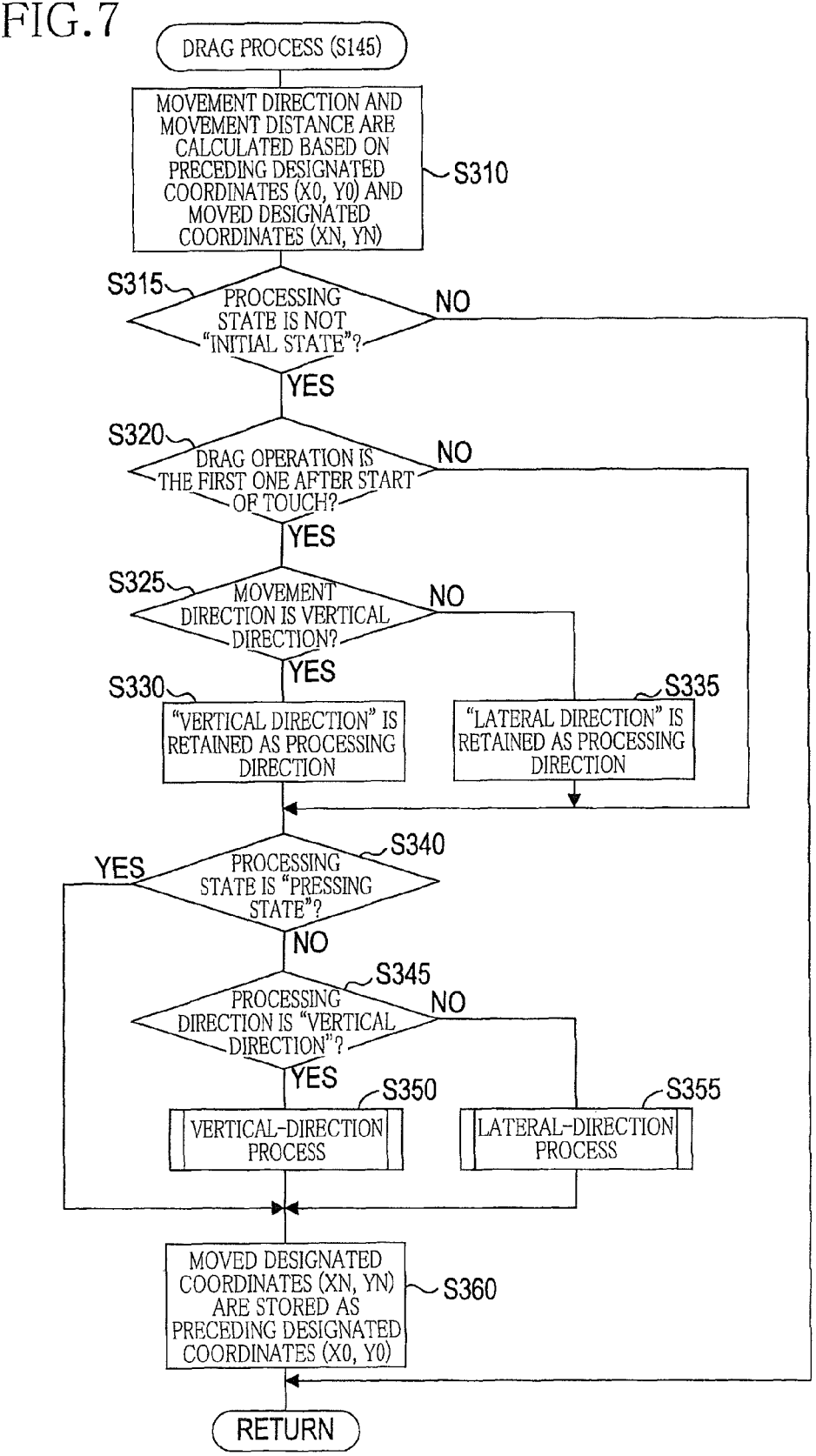
FIG. 7 is a flow chart showing details of drag process of S145 in FIG. 5.

When the CPU 11 starts the vertical-direction process shown in FIG. 8, the CPU 11 determines at S410 whether or not the current movement direction, which is the movement direction determined at S310 in FIG. 7, is the vertical direction. If it is determined at S410 that the current movement direction is not the vertical direction, the process proceeds to S460 and "initial state" is retained as the processing state. On the other hand, If it is determined at S410 that the current movement direction is the vertical direction, it is determined at S415 whether the processing state is one of "direction-determination waiting state" or "pressing or direction-determination waiting state".

If it is determined at S415 that the processing state is one of "direction-determination waiting state" or "pressing or direction-determination waiting state", it is determined at S420 whether or not the moved designated coordinates (XN, YN) are within a scroll-available region, i.e., in the scroll-only region 62 or the common region 63. If it is determined at S420 that the moved designated coordinates (XN, YN) are not within the scroll-available region, "initial state" is retained at S430 as the processing state. Then the process proceeds to S440. If it is determined at S420 that the moved designated coordinates (XN, YN) are within the scroll-available region, "scroll state" is retained at S425 as the processing state. Subsequently, at S435, the image is scrolled according to the movement distance and the movement direction, and the process subsequently proceeds to S440. Thus, the menu-list image 31 is scrolled in the movement direction by a distance corresponding to the movement distance. At S440, the moved designated coordinates (XN, YN) are stored in the RAM 13 as the preceding designated coordinates (X0, Y0).

If it is judged at S415 that the processing state is neither "direction-determination waiting state" nor "the pressing or direction-determination waiting state", it is determined at S445 whether or not the processing state is "scroll state". If it is determined at S445 that the processing state is not the scroll state, the process proceeds to S460. If it is determined at S445 that the processing state is the scroll state, it is determined at S450 whether or not the moved designated coordinates (XN, YN) are within the scroll-available region, as determined at S420. If it is determined at S450 that the moved designated coordinates (XN, YN) are not within the scroll-available region, the process proceeds to S430. If it is determined at S450 that the moved designated coordinates (XN, YN) are within the scroll-available region, the image is scrolled at S455 according to the movement distance and the movement direction, as scrolled at S435, and the process subsequently proceeds to S440.

In the meantime, when the CPU 11 starts the lateral-direction processing shown in FIG. 9, the CPU 11 determines at S510 whether or not the current movement direction is the lateral direction. If it is determined at S510 that the current movement direction is not the lateral direction, the process proceeds to S590 at which "initial state" is retained as the processing state. If it is determined at S510 that the current movement direction is the lateral direction, it is determined at S515 whether the processing state is one of "direction-determination waiting state" or "pressing or direction-determination waiting state".

If it is determined at S510 that the processing state is one of "direction-determination waiting state" or "pressing or direction-determination waiting state", it is determined at S520 whether or not the moved designated coordinates (XN, YN) are within a list region. The list region refers to an entire region in which the menu-list image 31 is displayed. If it is determined at S520 that the moved designated coordinates (XN, YN) are not within the list region, "the initial state" is retained as the processing state at S550 and the process proceeds to S540. If it is determined at S520 that the moved designated coordinates (XN, YN) are within the list region, it is determined at S525 whether or not the movement distance falls within 30 dots.

If it is determined at S525 that the movement distance falls within 30 dots, "region change state" is retained as the processing state in the RAM 13 at S530. Subsequently, at S535, the width of each region is changed according to the preceding designated coordinates (X0, Y0), the movement distance, and the movement direction, and the process then proceeds to S540. At S535 the width of each region is changed as described below. When the preceding designated coordinates (X0, Y0) are within the scroll region, which is combination of the scroll-only region 62 and the common region 63, and when the movement direction is the leftward direction, the entirety of the scroll region and the scroll-region-size change region 65 is enlarged in the leftward direction by an amount that corresponds to the movement distance. At the same time, the entirety of the tap region and the tap-region-size change region 64 is reduced in the leftward direction by an amount that corresponds to the enlargement amount of the scroll region.

If it is determined at S525 that the movement distance exceeds 30 dots, it is determined at S545 that the flick operation has been performed. Thus, the tap region and the scroll region are switched with each other, and the process subsequently proceeds to S550. In other words, the positional relationship between the tap region and the scroll region is reversed in the left-right direction.

If it is determined at S515 that the processing state is neither "direction-determination waiting state" nor "pressing or direction-determination waiting state", it is determined at S555 whether or not the processing state is "region change state". If it is determined at S555 that the processing state is the region change state, it is determined at S560 whether or not the moved designated coordinates (XN, YN) are within the list region. If it is determined at S560 that the moved designated coordinates (XN, YN) are not within the list region, the process proceeds to S550. If it is determined at S560 that the moved designated coordinates (XN, YN) are within the list region, the process proceeds to S535 at which the width of each region is changed as described above.

If it is determined at S555 that the processing state is not "region change state", it is determined at S565 whether or not the processing state is "tap-region-change waiting state". If it is determined at S565 that the processing state is the tap-region-change waiting state, it is determined at S570 whether or not the moved designated coordinates (XN, YN) are within the tap-region-size change region 64. If it is determined at S570 that the moved designated coordinates (XN, YN) are not within the tap-region-size change region 64, the process proceeds to S550. If it is determined at S570 that the moved designated coordinates (XN, YN) are within the tap-region-size change region 64, the process proceeds to S585. At S585, the width of only the region on which the pointer is touching is changed according to the preceding designated coordinates (X0, Y0), the movement distance, and the movement direction. In a case where the process has proceeded to S585 after determination that the moved designated coordinates (XN, YN) are within the tap-region-size change region 64 at S570, the pointer is touching on the tap-region-size change region 64. Therefore, in this case, the tap region and the tap-region-size change region 64 are enlarged or reduced in the movement direction by an amount that corresponds to the movement distance. More specifically, the tap region and the tap-region-size change region 64 are enlarged where the movement direction is the rightward direction while the tap region and the tap-region-size change region 64 are reduced where the movement direction is the leftward direction. After S585, the process proceeds to S540.

If it is determined at S565 that the processing state is not "tap-region-change waiting state", it is determined at S575 whether or not the processing state is "scroll-region-change waiting state". If it is determined at S575 that the processing state is not the scroll-region-change waiting state, the process proceeds to S550. If it is determined at S575 that the processing state is the scroll-region-change waiting state, it is determined at S580 whether or not the moved designated coordinates (XN, YN) are within the scroll-region-size change region 65. If it is determined at S580 that the moved designated coordinates (XN, YN) are not within the scroll-region-size change region 65, the process proceeds to S550. If it is determined at S580 that the moved designated coordinates (XN, YN) are within the scroll-region-size change region 65, the process proceeds to S585. In a case where the process proceeds to S585 after determination that the moved designated coordinates (XN, YN) are within the scroll-region-size change region 65 at S580, the pointer is touching on the scroll-region-size change region 65. Therefore, the scroll region and the scroll-region-size change region 65 are enlarged or reduced in the movement direction by an amount that corresponds to the movement distance. More specifically, the scroll region and the scroll-region-size change region 65 are enlarged where the movement direction is the leftward direction. The scroll region and the scroll-region-size change region 65 are reduced where the movement direction is the rightward direction. After S585, the process proceeds to S540. At S540, the moved designated coordinates (XN, YN) are stored as the preceding designated coordinates (X0, Y0) in the RAM 13.

Figure 10:
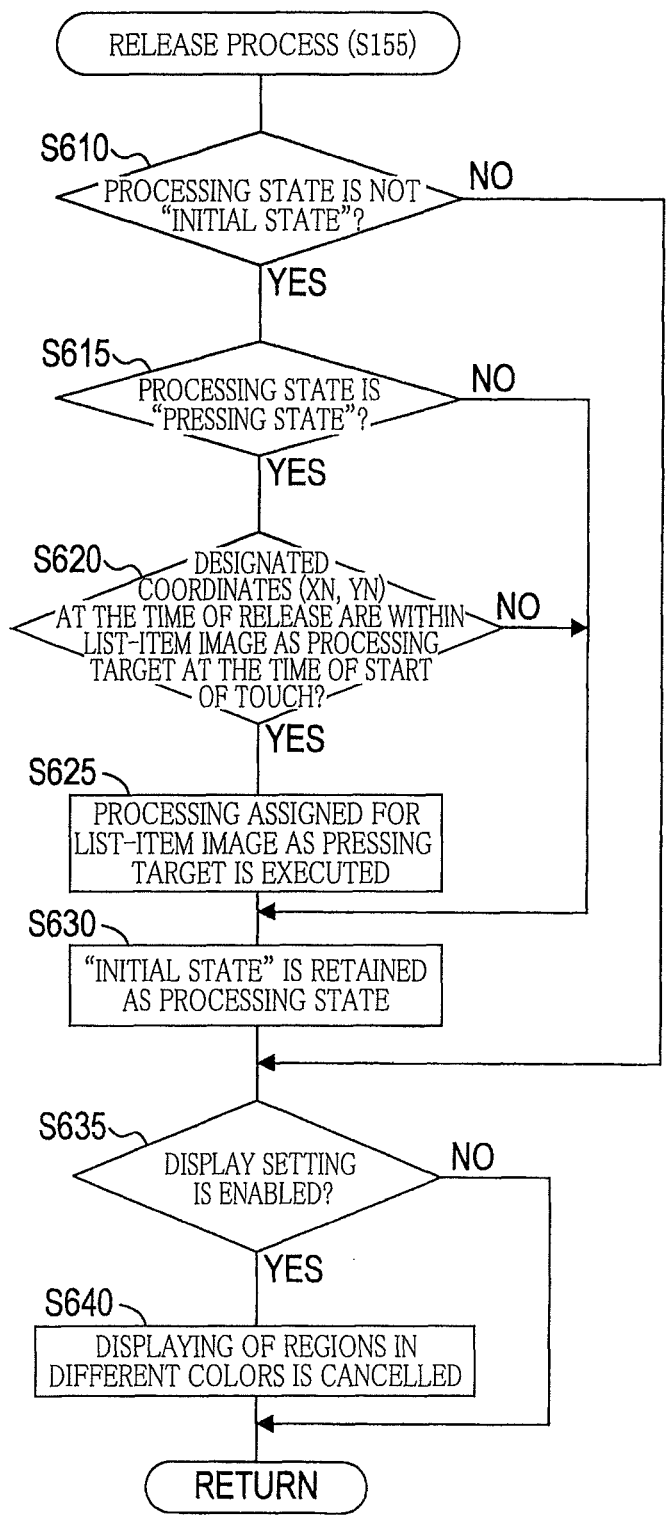
FIG. 10 is a flow chart showing details of release process of S155 in FIG. 5.

The release process of S155 in FIG. 5 will be explained with respect to FIG. 10. When the CPU 11 starts the release process, the CPU 11 determines at S610 whether the processing state is not "initial state". If it is determined at S610 that the processing state is the initial state, the process proceeds to S635. If it is determined at S6010 that the processing state is not the initial state, the process proceeds to S615 at which it is determined whether or not the processing state is "pressing state". If it is determined at S615 that the processing state is not the pressing state, the process proceeds to S630. If it is determined at 615 that the processing state is the pressing state, the process proceeds to S620 at which it is determined whether or not the designated coordinates (XN, YN) at the time of release are in one of the list-item images as the pressing target at the time of the start of the touch. In other words, it is determined whether or not the pointer has been touching on the same list-item image from the start of the touch till the release.

Where the list-item image as the pressing target at the time of the start of the touch is different from the list-item image as the pressing target at the time of the release, the process proceeds to S630. If the list-item image as the pressing target at the time of the start of the touch is the same as the list-item image as the pressing target at the time of the release, corresponding process assigned for the list-item image as the pressing target is executed at S625.

At S630, "initial state" is retained in the RAM 13 as the processing state. As determined at S215 in FIG. 6, it is determined at S635 whether or not the display setting is enabled. If it is determined that the display setting is not enabled, the release process ends. If it is determined that the display setting is enabled, displaying of the regions 61-65 in different colors is cancelled at S640.

There have been explained various processes executed for the screen example shown in FIG. 3C with reference to FIGS. 4-10. The processes described with reference to FIGS. 4-10 may be executed for the screen examples shown in FIGS. 2A-2C and FIGS. 3A-3B in which no common region is set. For example, the tap region 51 and the scroll region 52 in the screen examples shown in FIG. 2, etc., may correspond to the tap-only region 61 and the scroll-only region 62 in FIG. 3C, respectively.

In the MFP 1 described above, the display area 30 which includes the list region in which the menu-list image 31 is displayed is visually divided into the tap region and the scroll region. In the tap region, the tap operation by the pointer is acceptable. In the scroll region, the drag operation in the vertical direction by the pointer is acceptable. More specifically, in the display area in which the object images are displayed, there are set: the first operation region in which, where the pointer touches the first operation region, predetermined process for the object image that is being displayed at a position of the touch is executed; and the second operation region in which, where the pointer that is touching the second operation region moves in the arrangement direction with the touch maintained, the object images are scrolled. The first operation region and the second operation region are individually set, but may partially overlap each other. Further, each object image is included in both of the first operation region and the second operation region. Accordingly, where the user wishes to select a certain specific list-item image, the user taps a portion of the specific list-item image, which portion is displayed in the tap region, whereby corresponding process to the list-item image can be executed. On the other hand, where the user wishes to scroll the menu-list image 31, the user performs the drag operation with the pointer in the scroll region, whereby the menu-list image 31 can be scrolled. Accordingly, the user can easily obtain an intended operation result without suffering from conventionally experienced deterioration in the operability for the user.

In the MFP 1 described above, each of the tap region and the scroll region can be enlarged and reduced by the drag operation in the lateral direction. In this instance, the width of only one of the tap region and the scroll region can be changed. Further, the width of the other of the tap region and the scroll region can be changed in conjunction with the width change of the one of the tap region and the scroll region. In other words, where the one of the tap region and the scroll region is enlarged, the other of the tap region and the scroll region is reduced. Moreover, the tap region and the scroll region can be switched with each other by the flick operation in the lateral direction. Accordingly, it is possible to improve the operability and the usability for the user.

Modified Embodiments

It is understood that the present invention is not limited to the details of the illustrated embodiment but may be otherwise embodied without departing from the technical scope of the invention.

For instance, there may be considered various methods for initial setting of the widths of the regions 51, 52. In other words, there may be considered various methods for initial setting of the boundary between the two regions 51, 52, in the initial screen shown in FIG. 2A. Each width of the regions 51, 52 may be set on the basis of the maximum number of characters of character strings in each of the list-item images 41-45 included in the menu-list image 31. The characters in the character strings of the respective list-item images 41-45 are left-justified as shown in the drawings. Accordingly, the rightmost end of the character string that has the maximum character number is defined as the boundary between the two regions 51, 52.

Figure 11A:
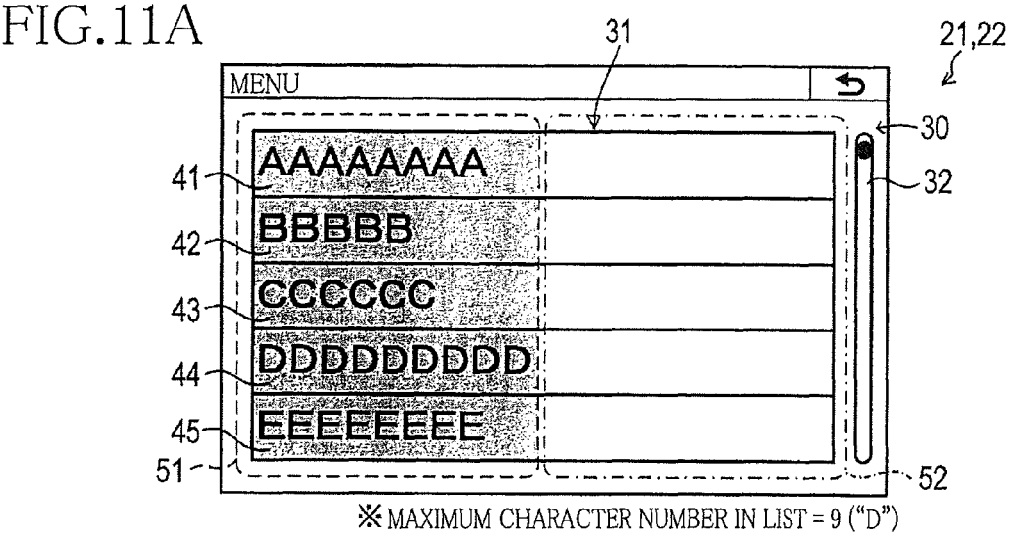
FIGS. 11A-11C are views for explaining a method for initial setting of respective widths of the tap region and the scroll region, i.e., for initial setting of a boundary between the tap region and the scroll region, in accordance with a number of characters in one of list-item images.
Figure 11B:
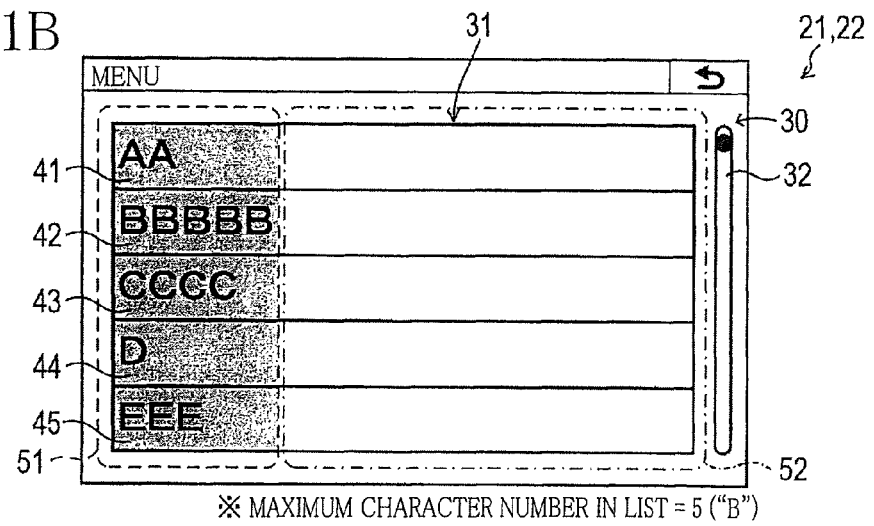

In an example shown in FIG. 11A, the number of characters in the character string "D . . . " of the list-item image 44 is maximum (i.e., nine characters). Accordingly the right side of the ninth character is defined as the boundary between the regions 51 and 52. In an example shown in FIG. 11B, the number of characters in the character string "B . . . " of the list-item image 42 is maximum (five characters). Accordingly the right side of the fifth character is defined as the boundary between the regions 51 and 52.

Figure 11C:
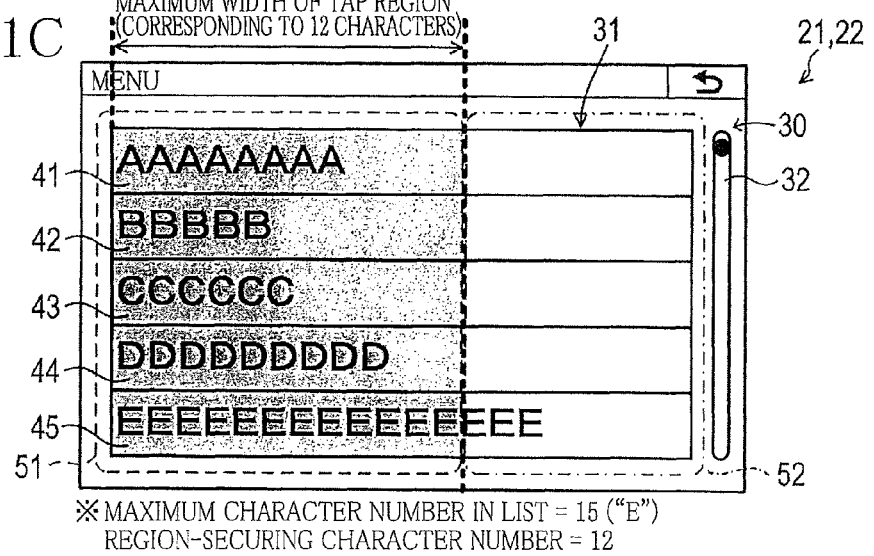

In an example shown in FIG. 11C, the number of characters in the character string "E . . . " of the list-item image 45 is maximum (i.e., fifteen characters). Accordingly the right side of the fifteenth character may be defined as the boundary between the regions 51 and 52. However, the width of the scroll region 52 may be small as the maximum character number increases so as to cause failure of the drag operation. To avoid such failure, an upper limit of the maximum character number (e.g., twelve characters) may be set such that the tap region 51 may be configured not to be enlarged beyond the maximum character number. Hereinafter, the upper limit of the maximum character number may be referred as "region-securing character number". In the example shown in FIG. 11C, the maximum character number is fifteen, which is in excess of twelve. Accordingly, the right side of the twelfth character is defined as the boundary between the regions 51 and 52. Thus, the width of the tap region 51 is limited so as to correspond to twelve characters at the maximum.

Figure 12:
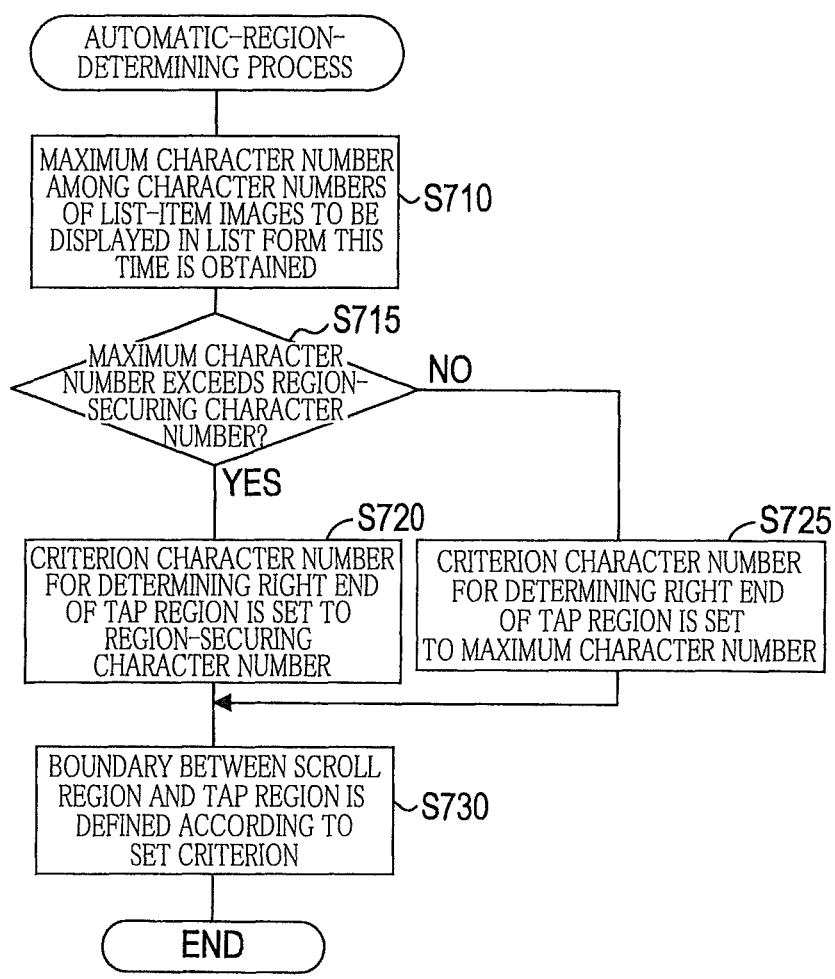
FIG. 12 is a flow chart of automatic-region-determining process executed by the CPU of the MFP to realize the method for initial setting of the respective widths of the two regions, i.e., for initial setting of the boundary therebetween, in accordance with the number of characters.

With reference to FIG. 12, there will be explained automatic-region-determining process executed by the CPU 11 for implementing a function for initial setting of the boundary between the two regions 51, 52 in accordance with the number of characters. When the CPU 11 starts the automatic-region-determining process for displaying the initial screen, the CPU 11 initially obtains at S710 the maximum character number among character numbers of the respective list-item images to be currently displayed in the form of a list. It is determined at S715 whether or not the obtained maximum character number is in excess of the region-securing character number. If it is determined at S715 that the obtained maximum character number is in excess of the region-securing character number, a criterion character number for determining the right end of the tap region 51 is set to the region-securing character number at S720. If it is determined at S715 that the obtained maximum character number is not in excess of the region-securing character number, the criterion character number is set to the maximum one of the character numbers of the list-item images 41-45 at S725. Subsequently, at S730, the boundary between the scroll region 52 and the tap region 51 is defined according to the set criterion character number.

The initial setting of the boundary between the two regions 51, 52 is thus performed in accordance with the number of characters, whereby the tap region 51 has a necessary and sufficient width, in the initial screen, enough to accommodate the character string. Further, as the width of the tap region 51 is determined in the above-described manner, the scroll region 52 also has an enough width. Accordingly, it is possible to further improve the operability for the user.

Figure 13A:
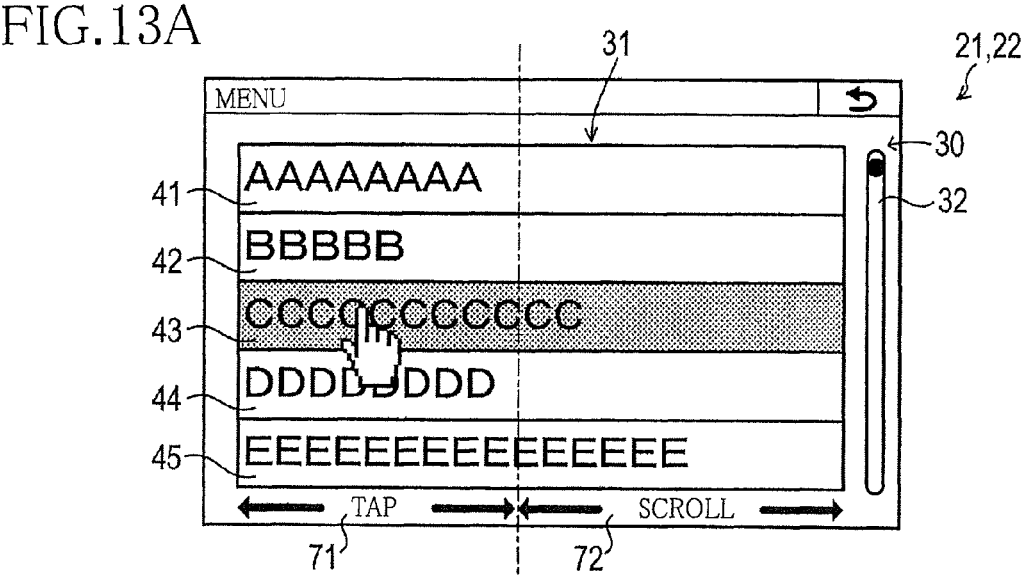
FIGS. 13A and 13B are views for explaining screen examples of the LCD according to other embodiments.

In the embodiment illustrated above, for visually distinguishing the tap region 51 and the scroll region 52 from other regions, the tap region 51 and the scroll region 52 are displayed in different colors. Other methods may be employed. For instance, as shown in FIG. 13A, the tap region 51 and the scroll region 52 may be visually distinguished by displaying: a tap-region indication image 71 of letters "TAP" and arrows indicative of a range; and a scroll-region indication image 72 of letters "SCROLL" and arrows indicative of a range.

Figure 13B:
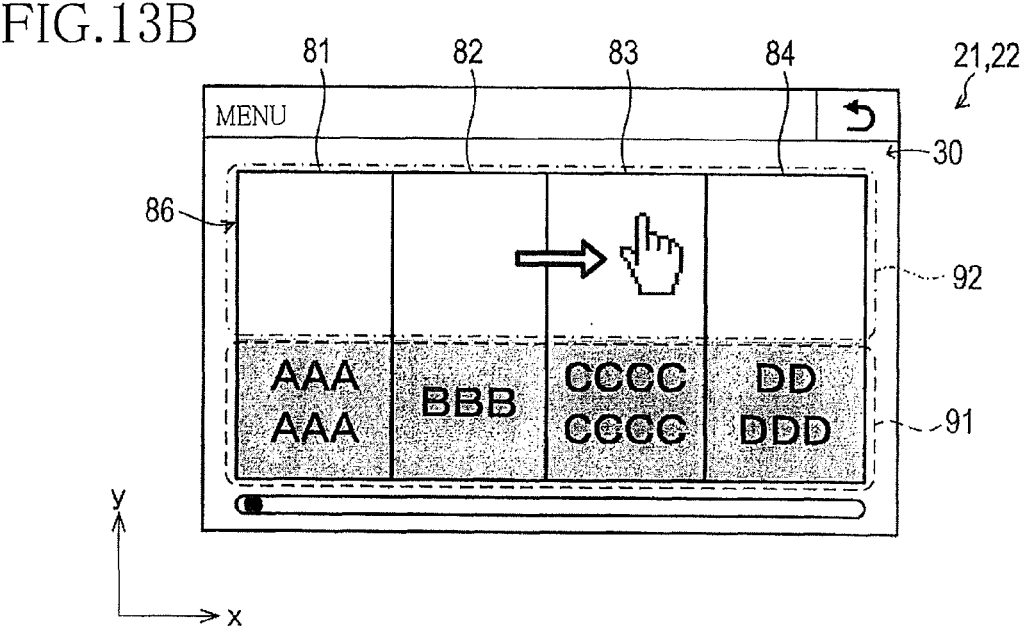

In the embodiment illustrated above, the menu-list image 31 in which the plurality of list-item images 41, 42, . . . are arranged in the up-down direction is scrolled in the up-down direction. The invention is applicable to a menu-list image 86 shown in FIG. 13B in which list-item images 81, 82, 83, 84 . . . are arranged in the lateral direction and which is configured to be scrolled in the lateral direction. In the screen example of FIG. 13B, approximately a lower half portion of the entire menu-list image 86 is defined as a tap region 91 while approximately an upper half portion is defined as a scroll region 92.

It is noted that the present invention is applicable to not only the UI of the KR, but also any UI configured such that a tap operation or a scroll operation can be performed on a list image in which a plurality of object images are arranged.

What is claimed is:

1. An image-display control system comprising:
   a display including a display area;
   a touch panel disposed over the display;
   a processor coupled with the display and the touch panel; and
   a memory storing instructions that, when executed by the processor, cause the image-display control system:
   to display a plurality of object images arranged in a first direction in the display area of the display, each of the plurality of object images having a unique process assigned;
   to determine a touch operation and a touch position of the touch operation while a pointer touches the display area;
   to execute a certain process when the determined touch operation is a touch-and-release operation and the determined touch position of the touch-and-release operation is in a first operation region of a certain object image of the plurality of object images, not to execute the certain process when the determined touch operation is the touch-and-release operation and the determined touch position of the touch-and-release operation is in a second operation region, of the certain object image, that is next to the first operation region in a second direction orthogonal to the first direction, not to scroll the plurality of object images including the certain object image when the determined touch operation is a drag operation in the first direction and the determined touch position of the drag operation is in the first operation region of the certain object image, and to scroll the plurality of object images including the certain object image when the determined touch operation is the drag operation and the determined touch position of the drag operation is in the second operation region of the certain object image;
   display the certain object image in a first display manner that is different from a display manner of other object images of the plurality of object images except for the certain object image when the touch position of the touch operation is in the first operation region, and not to display the certain object image in the first display manner when the touch position of the touch operation is in the second operation region;
   to determine a touch-start-position and a touch-moved-position of the drag operation, the touch-moved-position being the touch position moved from the touch-start-position by the drag operation; and
   to scroll the plurality of object images including the certain object image when the determined touch-start-position of the drag operation is in the second operation region and the determined touch-moved-position of the drag operation is in the second operation region, and not scroll the plurality of object images including the certain object image when the touch-start-position of the drag operation is in the second operation region and the touch-moved-position of the drag operation is in the first operation region.

2. The image-display control system according to claim 1, wherein the instructions further cause the image-display control system:
   when it is determined the touch operation is in the at least one of the first operation region and the second operation region, to execute the unique process that can be enlarged or reduced in the second direction, and
   when it is determined the touch operation is in one of the first operation region or the second operation region and it is determined that a position of the touch operation is moving in the other of the first operation region or the second operation region while keeping the touch operation, to enlarge one of the first operation region or the second operation region and reduce the other of the first operation region or the second operation region.

3. The image-display control system according to claim 2, wherein the instructions further cause the image-display control system:
   when it is determined the touch operation is in the first operation region and it is determined that a position of the touch operation is moving in the second direction while keeping the touch operation, to enlarge the first operation region in the second direction; and
   when it is determined the touch operation is in the second operation region and it is determined that a position of the touch operation is moving in the first direction while keeping the touch operation, to reduce the first operation region in the second direction.

4. The image-display control system according to claim 2, wherein the instructions further cause the image-display control system:
   to define a third operation region different from the first operation region and the second operation region in the display area, wherein the third operation region is not defined in the identical position to the first operation region and the second operation region and wherein at least a part of each of the plurality of object images is not included in the third operation region; and
   when it is determined the touch operation is in the third operation region and it is determined that a position of the touch operation is moving in the second direction while keeping the touch operation, only the one of the first operation region and the second operation region is enlarged or reduced.

5. The image-display control system according to claim 1, wherein the instructions further cause the image-display control system:
to determine whether or not a state of the touch operation on the display area by the pointer has satisfied a particular region-switching condition, based on the determination result of the touch operation and the position of the touch operation; and
when it is determined that the state has satisfied the particular region-switching condition, to switch the first operation region and the second operation region with each other.

6. The image-display control system according to claim 1, wherein the instructions further cause the image-display control system:
to define character strings in each of the plurality of object images, in which characters are arranged from one end of the object image to another end thereof;
to dispose the first operation region nearer to the one end than the second operation region, wherein the first operation region includes at least one of the characters of the character strings of said each of the plurality of object images, which one of the characters is the closest to the one end among the characters of the character strings; and
to define the first operation region and the second operation region, in an initial state, wherein the first operation region and the second operation region border each other along a boundary, wherein a dimension of the first operation region is equal to a dimension in accordance with a maximum number of the characters in the character strings in the second direction.

7. The image-display control system according to claim 1, wherein the instructions further cause the image-display control system to display the first operation region and the second operation region in the display area of the display in different colors.

8. A method of controlling an image to be displayed on a display including a display area, comprising the steps of:
displaying a plurality of object images arranged in a first direction in the display area of the display, each of the plurality of object images having a unique process assigned;
determining a touch operation and a touch position of the touch operation while a pointer touches the display area;
executing a certain process when the determined touch operation is a touch-and-release operation and the determined touch position of the touch-and-release operation is in a first operation region of a certain object image of the plurality of object images, not executing the certain process when the determined touch operation is the touch-and-release operation and the determined touch position of the touch-and-release operation is in a second operation region, of the certain object image, that is next to the first operation region in a second direction orthogonal to the first direction, not scrolling the plurality of object images including the certain object image when the determined touch operation is a drag operation in the first direction and the determined touch position of the drag operation is in the first operation region of the certain object image, and scrolling the plurality of object images including the certain object image when the determined touch operation is the drag operation and the determined touch position of the drag operation is in the second operation region of the certain object image;
display the certain object image in a first display manner that is different from a display manner of other object images of the plurality of object images except for the certain object image when the touch position of the touch operation is in the first operation region, and not to display the certain object image in the first display manner when the touch position of the touch operation is in the second operation region;
to determine a touch-start-position and a touch-moved-position of the drag operation, the touch-moved-position being the touch position moved from the touch-start-position by the drag operation; and
to scroll the plurality of object images including the certain object image when the determined touch-start-position of the drag operation is in the second operation region and the determined touch-moved-position of the drag operation is in the second operation region, and not scroll the plurality of object images including the certain object image when the touch-start-position of the drag operation is in the second operation region and the touch-moved-position of the drag operation is in the first operation region.

9. A non-transitory computer-readable storage medium in which is stored an image-display control program to be executed by a computer of an image-control system comprising:
a display including a display area;
a touch panel disposed over the display;
a processor provided in the computer and coupled with the display and the touch panel; and
a memory storing instructions included in the image-display control program that, when executed by the processor, cause the image-display control system:
to display a plurality of object images arranged in a first direction in the display area of the display, each of the plurality of object images having a unique process assigned;
to determine a touch operation and a touch position of the touch operation while a pointer touches the display area;
to execute a certain process when the determined touch operation is a touch-and-release operation and the determined touch position of the touch-and-release operation is in a first operation region of a certain object image of the plurality of object images, not to execute the certain process when the determined touch operation is the touch-and-release operation and the determined touch position of the touch-and-release operation is in a second operation region, of the certain object image, that is next to the first operation region in a second direction orthogonal to the first direction, not to scroll the plurality of object images including the certain object image when the determined touch operation is a drag operation in the first direction and the determined touch position of the drag operation is in the first operation region of the certain object image, and to scroll the plurality of object images including the certain object image when the determined touch operation is the drag operation and the determined touch position of the drag operation is in the second operation region of the certain object image;

display the certain object image in a first display manner that is different from a display manner of other object images of the plurality of object images except for the certain object image when the touch position of the touch operation is in the first operation region, and not to display the certain object image in the first display manner when the touch position of the touch operation is in the second operation region;

to determine a touch-start-position and a touch-moved-position of the drag operation, the touch-moved-position being the touch position moved from the touch-start-position by the drag operation; and to scroll the plurality of object images including the certain object image when the determined touch-start-position of the drag operation is in the second operation region and the determined touch-moved-position of the drag operation is in the second operation region, and not scroll the plurality of object images including the certain object image when the touch-start-position of the drag operation is in the second operation region and the touch-moved-position of the drag operation is in the first operation region.

10. The image-display control system according to claim 1, wherein the display area comprises (a) a first display area including the first operation region and the second operation region and (b) a second display area, wherein the instructions cause the image-display control system:

to display at least two of the plurality of object images in the first display area;

to display a scroll-position-indication bar, in the second display area, indicating a relative position of the at least two object images, displayed in the first display area, of the plurality of object images displayed in the first direction;

when it is determined the touch operation is on the scroll-position-indication bar in the second display area, to scroll the plurality of object images in the first direction such that the at least two object images, that are at least two object images corresponding to the position of the touch operation on the scroll-position-indication bar, are displayed in the first display area.

* * * * *